(12) United States Patent
Lim et al.

(10) Patent No.: US 7,554,937 B2
(45) Date of Patent: Jun. 30, 2009

(54) ADAPTIVE PACKET TRANSMISSION METHOD FOR TRANSMITTING PACKETS IN MULTIBEAM SATELLITE COMMUNICATION SYSTEM

(75) Inventors: Kwang Jae Lim, Daejon (KR); Soo Young Kim, Daejon (KR); Deock Gil Oh, Daejon (KR)

(73) Assignee: Electronics and Telecommunications Research Institute (KR)

( * ) Notice: Subject to any disclaimer, the term of this patent is extended or adjusted under 35 U.S.C. 154(b) by 960 days.

(21) Appl. No.: 10/717,799

(22) Filed: Nov. 19, 2003

(65) Prior Publication Data

US 2004/0100941 A1    May 27, 2004

(30) Foreign Application Priority Data

Nov. 20, 2002   (KR) .................. 10-2002-0072200

(51) Int. Cl.
*H04B 7/185* (2006.01)
*H04Q 7/20* (2006.01)
*H04B 7/216* (2006.01)
*H04B 7/212* (2006.01)

(52) U.S. Cl. ............... 370/316; 370/320; 370/321; 455/427; 455/12.1

(58) Field of Classification Search ............ 370/316, 370/318, 320, 321, 324, 328; 455/427, 12.1
See application file for complete search history.

(56) References Cited

U.S. PATENT DOCUMENTS 5,835,847 A * 11/1998 Gilmore et al. ............ 455/12.1

6,018,528 A    1/2000 Gitlin et al.

(Continued)

FOREIGN PATENT DOCUMENTS

KR    1998-033158    7/1998

(Continued)

OTHER PUBLICATIONS

Paul Bender "CDMA/HDR: A Bandwidth-Efficient High-Speed Wireless Data Service for Nomadic Users", IEEE Communications Magazine, Jul. 2000 (pp. 70-76).

(Continued)

*Primary Examiner*—George Eng
*Assistant Examiner*—Un C Cho
(74) *Attorney, Agent, or Firm*—Blakely, Sokoloff, Taylor & Zafman

(57) ABSTRACT

Provided is an adaptive packet transmission method in a cellular mobile communication system using a multibeam satellite. The method includes the steps of: a) being periodically reported, from mobile stations, of average receiving power levels of beam pilot signals transmitted in a plurality of beams; b) estimating a path gain between beams and the mobile station based on the reported average power levels of beam pilot signals; c) determining priorities for packets to be transmitted to each of the mobile stations; d) selecting a beam requiring the lowest transmission power for transmitting the packet having the highest priority, and allocating the lowest power required for satisfying a predetermined packet reception quality when the packet is transmitted in the selected radio resource, by using the path gain estimated for each of the mobile stations; and e) if the radio resources and/or the transmission power that can be used are not sufficient or if there is a packet to be allocated, performing the step c).

18 Claims, 10 Drawing Sheets

U.S. PATENT DOCUMENTS

| | | | |
|---|---|---|---|
| 6,031,827 | A | 2/2000 | Rikkinen et al. |
| 6,219,343 | B1 | 4/2001 | Honkasalo et al. |
| 6,272,340 | B1 * | 8/2001 | Wright et al. ............... 455/427 |
| 6,278,701 | B1 | 8/2001 | Ayyagari et al. |
| 6,314,084 | B1 | 11/2001 | Kahale et al. |
| 6,317,412 | B1 * | 11/2001 | Natali et al. ................ 370/208 |
| 6,317,435 | B1 | 11/2001 | Tiedemann, Jr. et al. |
| 6,674,750 | B1 * | 1/2004 | Castellano ................... 370/354 |
| 6,759,978 | B2 * | 7/2004 | Lalezari ....................... 342/354 |
| 6,850,732 | B2 * | 2/2005 | Patterson et al. ............ 455/12.1 |
| 7,068,615 | B2 * | 6/2006 | Niesen ........................ 370/313 |
| 7,072,692 | B1 * | 7/2006 | Katz et al. ............... 455/562.1 |
| 7,142,521 | B2 * | 11/2006 | Haugli et al. ............... 370/320 |

FOREIGN PATENT DOCUMENTS

KR          1999-0071875          9/1999

OTHER PUBLICATIONS

Justin Chuang et al., "Beyond 3G: Wideband Wireless Data Access Based on OFDM and Dynamic Packet Assignment", IEEE Communications Magazine, Jul. 2000, pp. 78-87.

Matthew Andrews et al.; "Providing Quality of Service of a Shared Wireless Link" IEEE Communications Magazine, Feb. 2001 (pp 150-154).

Ljupco Jorguseski et al. "Radio Resource Allocation in Third-Generation Mobile Communication Systems"; IEEE Communications Magazine, Feb. 2001 (pp. 117-123).

Vincent Huang et al.; "QoS-Oriented Access Control for 4G Mobile Multimedia CDMA Communications"; IEEE Communications Magazine; Mar. 2002 (pp. 118-125).

Lei Song et al.; Hierachial SIR and rate Control on the forward Link for CDMA Data Users Under Dellay and Error Contraints; IEEE Journal on delected areas in communications, COL 19. No. Oct. 10, 2001 (1871-1882).

* cited by examiner

ADAPTIVE PACKET TRANSMISSION METHOD FOR TRANSMITTING PACKETS IN MULTIBEAM SATELLITE COMMUNICATION SYSTEM

FIELD OF THE INVENTION

The present invention relates to a method for transmitting data packets through a forward link in a multibeam satellite communication system; and, more particularly, to a method for allocating a radio resource, transmission mode and transmission power to each packet to be transmitted, and a computer-readable recording medium for recording a program that implements the method.

DESCRIPTION OF RELATED ART

Generally, a second-generation terrestrial cellular mobile communication system that provides base station-based communication service to subscribers, such as Interim Standard-95 (IS-95) and Group Special Mobile (GSM), mainly focuses on a voice communication service and uses a circuit-switched system. In the circuit-switched system, a radio link to provide a service is defined by a fixed frequency band, time slot or spreading code. A radio resource for each user service is determined by the system when the service is initially set up, and the allocated resource is exclusively used to provide the service for the corresponding user until the service is terminated. However, the circuit-switched system is not suitable to a packet transmission service having intermittent traffics, such as the Internet service.

In case of packet traffics, the amount of data to be transmitted is not fixed, but changes according to time. Moreover, no data may be generated at a certain moment. If this packet service is provided through a radio link using a circuit-switched system, the radio resource fixedly allocated may be not sufficient to transmit the packets when the amount of data is larger than that supported by the allocated resource. On the other hand, when the amount of the instant traffic is small, a part of the resource may not be used, or, in the worst case, when there is no traffic, no radio resource may be used at all. This leads to inefficient usage of radio resource.

The third-generation mobile communication system, such as Wideband Code Division Multiple Access (WCDMA) of the $3^{rd}$ Generation Partnership Project (3GPPP) or CDMA2000 of the $3^{rd}$ Generation Partnership Project 2 (3GPP2), provides diverse multimedia services including packet services as well as voice service, and supports both circuit switching and packet switching modes. In the packet switching mode of the $3^{rd}$ generation system, a radio resource is shared by users on service and used only when packets need to be transmitted actually. Accordingly, the system resource can be efficiently used in the packet switching mode due to statistical multiplexing, and eventually, the transmission capacity of the system is increased. In this packet switching mode, it is very important to efficiently allocate the limited radio resource for each packet transmission.

The 1×Evolved Data Only (1×EV DO) of the 3GPP2 is a representative technology designed for packet services. It adopts the packet switching to improve the spectrum efficiency, which is disclosed in a paper published by Paul Bender et al., CDMA/HDR: A Bandwidth-Efficient High-Speed Wireless Data Service for Nomadic Users, *IEEE communication Magazine*, July 2000. In the forward link, user packets are time-division multiplexed. At every time slot, packets are always transmitted at a maximum power available in a base station. The user estimates a signal-to-interference ratio of pilot symbols which are inserted in the central part of each time slot. Then, the user selects a transmission rate appropriate for the current channel condition from a predetermined transmission rate table and informs it to the base station.

The base station performs a scheduling process for packet transmission based on the transmission rate reported by each user, and transmits the packets at the reported transmission rate in a scheduled time slot. There are 12 types of transmission rates, each of which is a combination of a symbol repetition number, a modulation type, and a coding rate. Since packets are always transmitted at a maximum level of power in the 1×EV DO, there is an advantage that the power control for the forward link is not necessary. However, this leads to a problem that unnecessarily large power is used for users on a good channel condition and thus causes unnecessarily high interference between the users in the adjacent cells.

High Speed Downlink Packet Access (HSDPA) under the development by the 3GPP is another technology for high-speed packet services, which is disclosed in 3GPP TS 25.211, TS 25.212, TS 25.213, and TS 25.214 Release 5, 2002. In the HSDPA system, packets can be transmitted to a plurality of users simultaneously in a time slot by using multiple codes. The user on service estimates the receiving power levels of signal and interference in the HSDPA channel, selects the transmission rate and transmission mode, which are suitable for the current channel condition, and reports them to the base station. In such system, although users estimate and report the current signal quality, the interference may not remain the same when the packet is actually transmitted in the next frame. The actual interference in the next frame changes according to the transmission power allocated for other packet transmissions in the same or adjacent cell, which leads to an interference level different from that estimated by the user.

In the forward link, the transmitted power and the interference from other transmissions directly affect the system capacity. For the terrestrial cellular system, path loss is generally proportional to $d^3$ or $d^4$ when d is the distance from a base station to a user (i.e., a mobile station), and the path loss exponentially increases with the distance. When the user locates near the base station where the path loss is relatively small, even though a packet is transmitted at a high power, the interference to other users in the adjacent cell will be small. However, in case of a multibeam satellite system, the path loss does not exponentially increases with the distance from the center of a cell to a user, but simply show only a difference of a few dB according to a beam pattern. In this case, a strong signal from the adjacent beam causes serious interference.

A real-time multimedia service, e.g., voice or video transmission, demands that packets should be transmitted within a particular time. The 1×EV DO system of the 3GPP2 and the HSDPA system of the 3GPP have a problem that they cannot satisfy the quality of service required for the services sensitive to delay.

Meanwhile, Internet multimedia services need a high transmission rate and also diverse rates from a few Kbit/sec to several tens of Mbit/sec. To provide such diverse and high-speed services, a wide bandwidth should be divided and effectively used, which is suggested in U.S. Pat. No. 6,018,528, entitled "System and Method for Optimizing Spectral Efficiency Using Time-Frequency-Code slicing." The large bandwidth can be efficiently used, when it is divided into multiple small resources, such as two dimensions of frequency band/time slot, frequency band/spreading code, or time slot/spreading code, or into three dimensions of frequency band/time slot/spreading code. When using such divided resources, it is important to determine which and how many resources are used for packet transmission in order to maximize the system transmission rate. However, the U.S. Pat. No. 6,018,528 is not suggesting any specific radio resource allocation method. Moreover, to efficiently allocate the transmission power and radio resources to users on different channel conditions and to maximize the system efficiency are so complicated that they cannot be solved within a limited time, which is disclosed in a paper by Jens Zander and Seong-Lyun Kim, "Radio Resource Management for Wireless Networks," *Artech House Publisher,* 2001.

SUMMARY OF THE INVENTION

It is, therefore, an object of the present invention to provide a packet transmission method that can allocate a transmission power properly based on channel conditions in order to minimize interference to the other packet transmission, allocate radio resource properly according to the user requirements and channel conditions within a limited time, and support both real-time and non-real-time services and diverse transmission rates in order to efficiently utilize the limited radio capacity, which changes according to channel conditions, efficiently for a radio resource and packet transmission allocation wherein a transmission frame is divided in three-dimensional resource, i.e., frequency slot/time slot/spreading code, to support diverse transmission rates and flexible allocation; and a computer-readable recording medium for recording a program that implements the packet transmission method.

In accordance with an aspect of the present invention, there is provided an adaptive packet transmission method in a cellular mobile communication system using a multibeam satellite, including the steps of: a) being periodically reported, from mobile stations, of average receiving power levels of beam pilot signals transmitted in a plurality of beams; b) estimating a path gain between beams and the mobile station based on the reported average power levels of beam pilot signals; c) determining priorities for packets to be transmitted to each of the mobile stations; d) selecting a beam requiring the lowest transmission power for transmitting the packet having the highest priority, and allocating the lowest power required for satisfying a predetermined packet reception quality when the packet is transmitted in the selected radio resource, by using the path gain estimated for each of the mobile stations; and e) if the radio resources and/or the transmission power that can be used are not sufficient or if there is a packet to be allocated, performing the step c).

In accordance with another aspect of the present invention, there is provided a computer-readable recording medium for recording a program for an adaptive packet transmission method in a cellular mobile communication system using a multibeam satellite, the adaptive packet transmission method including the steps of: a) being periodically reported, from mobile stations, of average receiving power levels of beam pilot signals transmitted in a plurality of beams; b) estimating a path gain between beams and the mobile station based on the reported average power levels of beam pilot signals; c) determining priorities for packets to be transmitted to each of the mobile stations; d) selecting a beam requiring the lowest transmission power for transmitting the packet having the highest priority, and allocating the lowest power required for satisfying a predetermined packet reception quality when the packet is transmitted in the selected radio resource, by using the path gain estimated for each of the mobile stations; and e) if the radio resources and/or the transmission power that can be used are not sufficient or if there is a packet to be allocated, performing the step c).

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
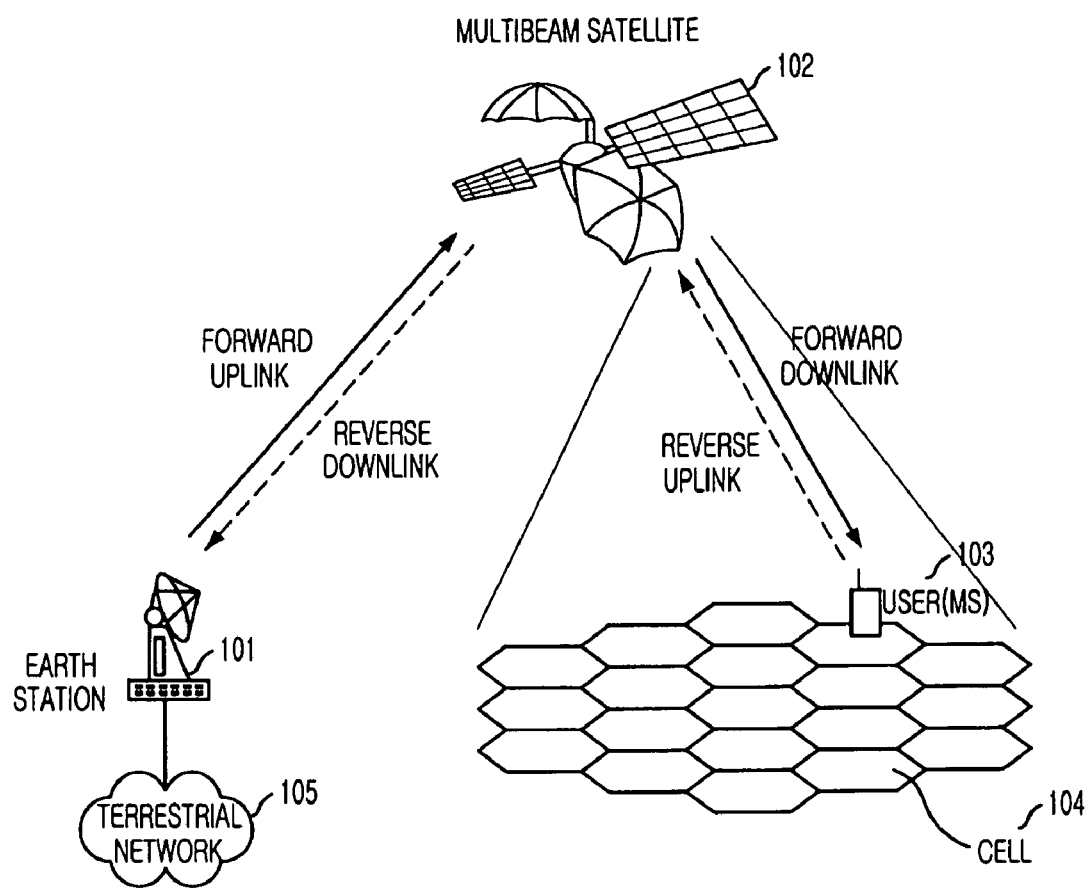
FIG. 1 is an exemplary diagram describing a cellular mobile satellite communication system using a multibeam satellite in accordance with the present invention.

FIG. 1 is an exemplary diagram describing a cellular mobile satellite communication system using a multibeam satellite in accordance with an embodiment of the present invention. In the drawing, the reference numeral "101" denotes an earth station; "102", a multibeam satellite; "103", a mobile station; "104", a cell; and "105", a terrestrial network.

In a cellular satellite mobile system using a multibeam satellite, a service area is divided into a plurality of cells 104, as in the terrestrial cellular mobile communication system and each cell is serviced by a beam. A user (i.e., a mobile station) 1-3 forms a communication link with the multibeam satellite 102 through a beam that covers the cell at which the mobile station 103 is located, that is, a beam to which the mobile station 103 belongs.

The multibeam satellite 102 relays the communication signals between the mobile stations 103 and the earth station 101. The earth station 101 works as a gateway to the terrestrial network 105 such as the Internet. As a central control station, the earth station 101 also performs control functions of the satellite network, such as connection, maintenance and termination of the service for a user, through the satellite.

The packets and signals from the terrestrial network are transferred to the user through the forward link of the earth station 101—the multibeam satellite 102—the mobile station 103 connection. The packets and signals from the mobile station 103 are transferred to the terrestrial network 105 through the reverse link of the mobile station 103—the multibeam satellite 102—the earth station 101 connection.

In FIG. 1, if the multibeam satellite 102 has a capability of signaling and call processing, it can perform the function of a central control station. In this case, the time delay between the central control station and the user can be reduced.

In the multibeam satellite system, the earth station 101 or the multibeam satellite 102 can be designed to perform the function of the central control station, and hereinafter, it will be referred to just as a central station that performs the allocation process for packet transmission.

As shown in FIG. 1, all beam signals share the same frequency band and they are spread by spreading codes, as a Code Division Multiple Access (CDMA) system in which all cells use the same frequency band.

Each beam transmits a unique pilot signal to enable the mobile station 103 to perform synchronization and demodulation easily, and to know which beam signal is receiving.

Each beam signal can be transmitted by using a different pseudo noise (PN) scrambling code, as in the CDMA cellular system. In this case, each beam can reuse the whole set of the orthogonal spreading codes in the same time and bandwidth. On the other hand, every beam signal can use the same PN scrambling code and share a set of the orthogonal spreading codes.

In case that each beam uses a different PN scrambling code, the beam signals generate interference to each other because of the non-zero correlation property between the PN codes. To the contrary, in case that all of the beams use the same PN scrambling code and share a set of the orthogonal spreading codes, the interference between the beam signals can be minimized due to the orthogonality between different spreading codes, when the adjacent beams use the spreading codes different from each other. In this case, however, the number of spreading codes available in a beam can be limited. Therefore, to avoid such code limitation problem, the same spreading code should be reused in the beams away each other. The packet transmission allocation method of the present invention can be applied to both of the two systems described above.

Figure 2:
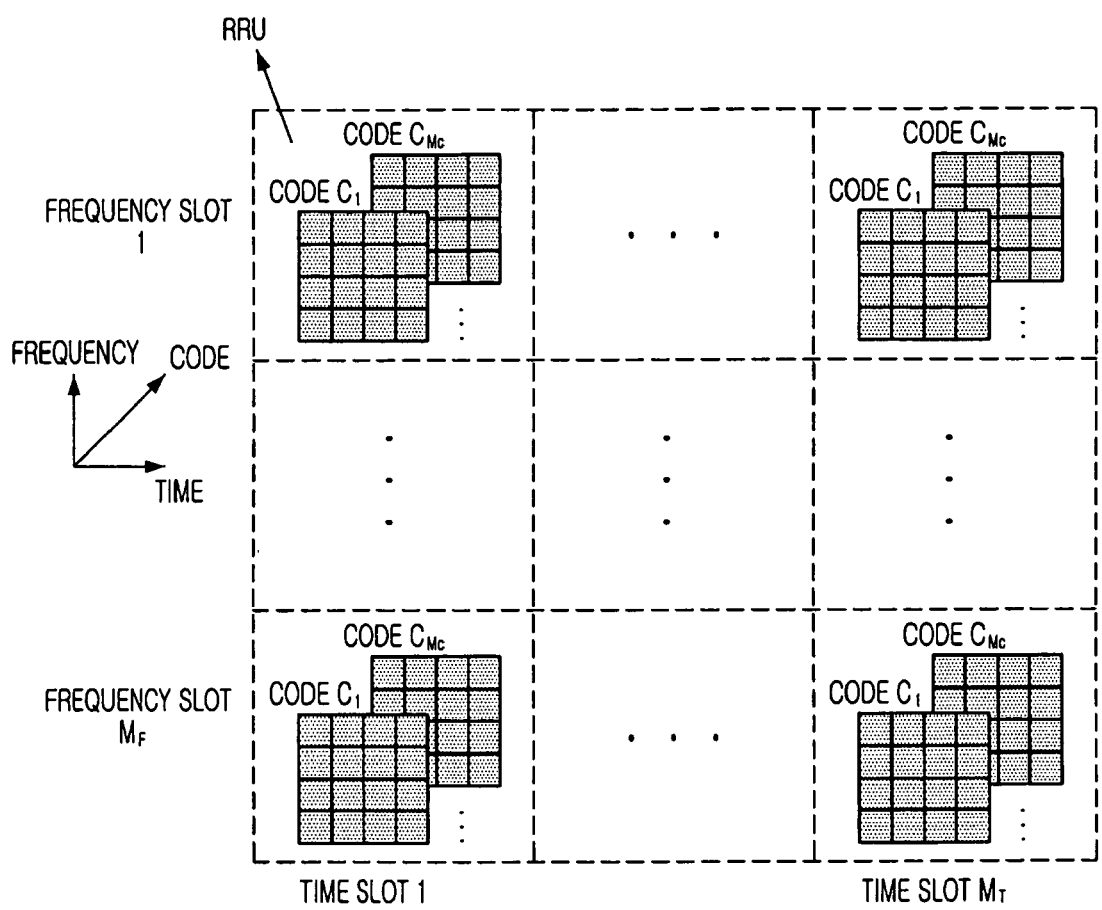
FIG. 2 is a diagram showing a transmission frame which is divided into three dimensions of time/frequency/code.

FIG. 2 is a diagram showing a transmission frame which is divided into three dimensions of time/frequency/code. It shows that a transmission medium used for packet transmission in the forward link is divided into three dimensions of frequency slot/time slot/spreading code.

In the time domain, the beam signal is transmitted in a frame, which has predetermined time duration and consists of multiple time slots. Each time slot has regular time duration and consists of a predetermined number of transmission symbols. In the frequency domain, the beam signal is transmitted over multiple subcarriers for an efficient wideband high-speed transmission on multipath fading channel. In the frequency domain, the set of subcarriers is divided into multiple frequency slots, and each frequency slot consists of a predetermined number of subcarriers. In the code domain, each transmission symbol in a frame is spread and transmitted by a spreading code.

As shown above, each frame in the forward link is divided into three-dimensional resources of the frequency slots in the frequency domain, the time slots in the time domain, and the spreading codes in the code domain. A combination of frequency slot/time slot/spreading code is defined as a radio resource unit (RRU). Each packet is transmitted by using one or more RRUs.

The packet transmission allocation algorithm in the central station selects a set of RRUs, a transmission mode and a transmission power suitable for each packet transmission.

The beam pilot signal can be transmitted over other subcarriers that are not used for packet transmission in a frame, or it can be inserted periodically in the subcarrier which is used for packet transmission. The user estimates the received power and the signal-to-noise-and-interference ratio (SINR) of the beam pilot signal, and then periodically reports them to the central station through the reverse link. Then, the central station allocates a beam and radio resources for packet transmission by using the pilot estimation report.

Figure 3:
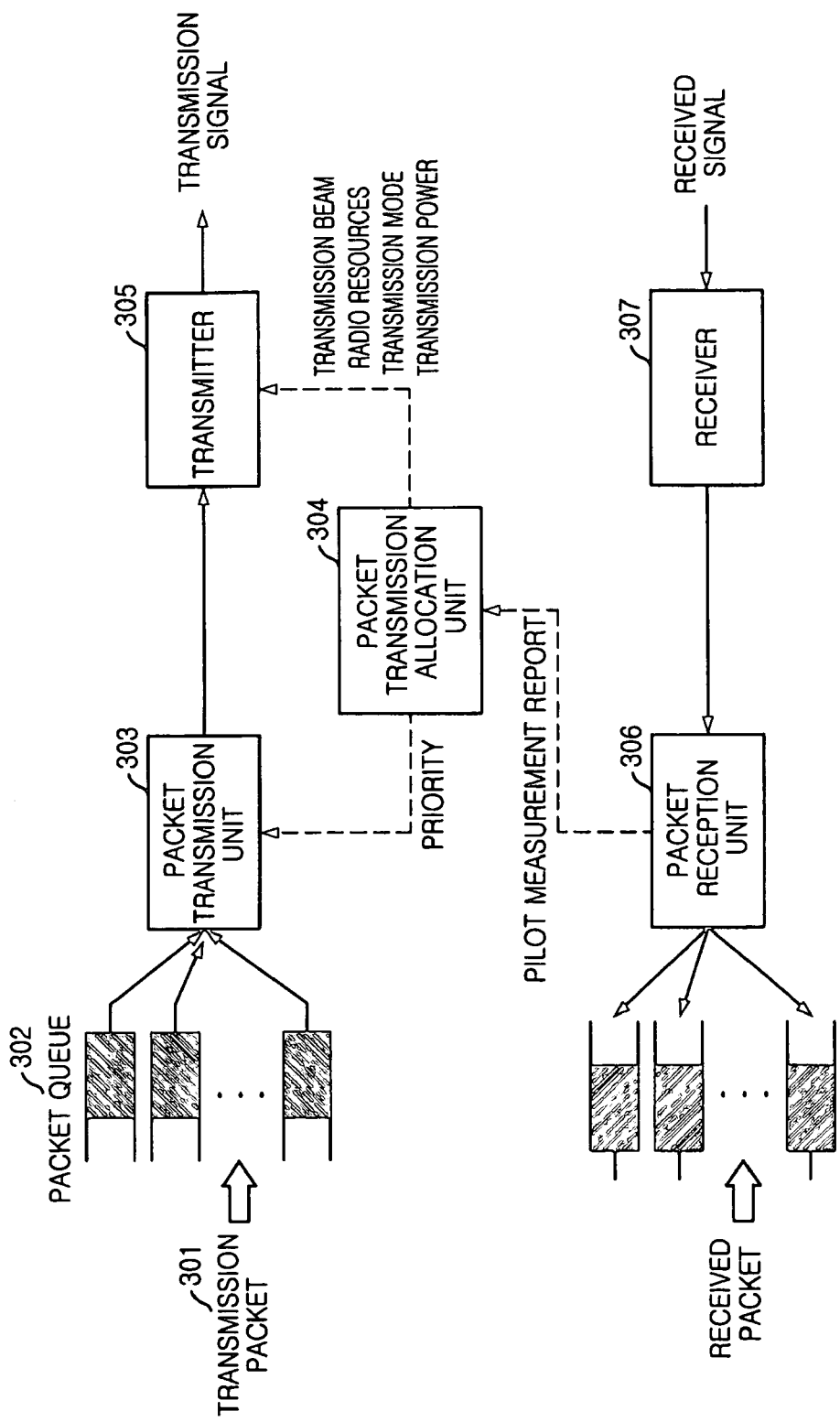
FIG. 3 is a block diagram illustrating a central control station in accordance with an embodiment of the present invention.

FIG. 3 is a block diagram illustrating a central control station in accordance with an embodiment of the present invention. It illustrates the functions of the central control station performed in an earth station or a satellite, focusing on the aspect of radio resource allocation.

The transmission packets 301 generated in the terrestrial network arrive at the central control station and collected by a packet queue 302 corresponding to each service. The packet includes user service data, or control data for signaling between the network and the mobile station.

The packet transmission unit 303 performs packet scheduling and the function of a data link layer including an automatic retransmission request (ARQ).

The packet transmission allocation unit 304 determines the transmission priority of each arrived packet for packet scheduling. It also determines a beam, radio resources, transmission power and transmission method for the packet, and then it informs a transmitter 305 of the decision.

The transmitter 305 transmits the packet using the selected beam, radio resources, transmission power, and transmission mode according to the decision of the packet transmission allocation unit. The transmitter 305 transmits beam pilot signals and control messages that inform the user of the packet transmission, too. The control message can be transmitted using radio resources that are different from those used for the data packet transmission, or it can be transmitted inserted in the front part of the data packet transmission.

Meanwhile, the receiver 307 receives measurement report messages and data packets that are transmitted from the mobile station through the reverse link. A packet receiver 306 transfers the measurement report message of each mobile station to the packet transmission allocation unit 304 so that the packet transmission allocation unit 304 can estimate the transmission path gain to each user. The transmission path gain is used for packet transmission allocation in the forward link. Also, the packet receiver 306 performs the function of data link layer for the data packets transmitted from each user, and transfers them to the reception packet queue so that the function of a higher layer can be performed, or that the data packets can be delivered to the terrestrial network.

Figure 4:
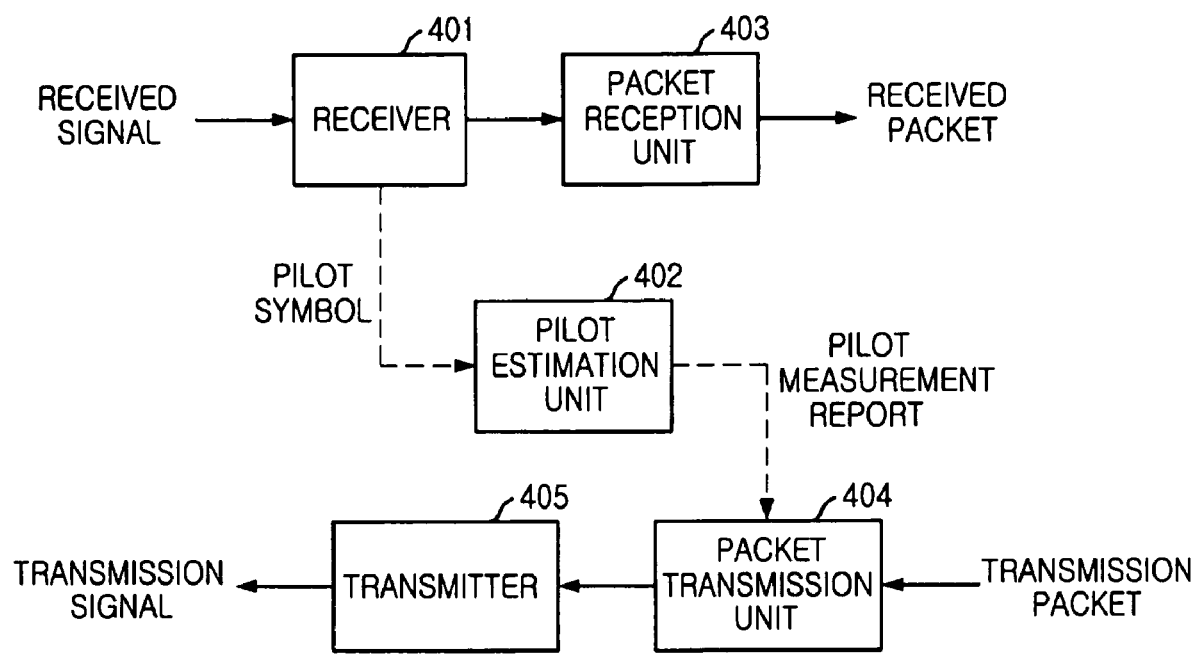
FIG. 4 is a block diagram depicting a user mobile station in accordance with an embodiment of the present invention.

FIG. 4 is a block diagram depicting a user mobile station in accordance with an embodiment of the present invention. The receiver 401 of the mobile station receives pilot signals, control messages and packets in the frame transmitted through the forward link. The received pilot symbols are delivered to the pilot estimation unit 402 and used for estimating the intensity and the SINR of each beam pilot.

The pilot estimation unit 402 transforms the estimated result into a measurement report message and delivers the measurement report message to the packet transmission unit 404. The measurement report message can be merged with the data packet at the packet transmission unit 404 and transmitted through the reverse link, or transmitted over a separate signal or packet. The transmitter 405 transmits the measurement report message to the central station through the reverse link.

Since the packet transmission allocation is performed based on the pilot measurement report from users, the estimation accuracy and a fast report are significant factors that determine the transmission efficiency of the system. When the used bandwidth is larger than the frequency correlation bandwidth of the channel, the reception signals go through frequency-selective fading, and thus, the signal on each subcarrier may undergo different fading. In this case, the frequency spacing between the subcarriers on which pilot signals are transmitted should be smaller than the frequency correlation bandwidth. The pilot measurement and report can be performed separately with respect to the pilot signals of each band. In this case, the packet transmission allocation unit can select a frequency slot suitable for each user based on the pilot measurement report, and thus, the system can support the adaptability to the frequency-selective fading in frequency domain, if the round trip delay between the central station and the user is much shorter than the fading correlation time.

The satellite system has a long propagation delay due to the distance. When the earth station performs the role of the central control station and the satellite is a geostationary orbit satellite, the round trip delay is about 0.5 second. The correlation time of the multipath fading depends on the user speed and the used carrier frequency. In the satellite system, however, the correlation time is much smaller than the round trip delay. Accordingly, in the satellite system, it is substantially impossible to adaptively allocate frequency slots according to the channel condition changed by the fast frequency-selective fading. Therefore, in the satellite system, the subcarriers in each frequency slot are widely distributed over the entire bandwidth in order to achieve the frequency diversity over the frequency-selective fading. For the pilot measurement report, the mobile station reports the average value over all of the pilot subcarriers in frequency domain.

Meanwhile, the object of packet transmission allocation suggested in the present invention is to optimize the resource allocation for packet transmission in each frame within a limited time, i.e., the frame duration. To optimize the packet allocation, the present invention divides the packet allocation process into three sub-processes: determining packet transmission priority, selecting radio resources and transmission mode, and allocating transmission power.

In the present invention, packets are allocated in two methods. One is a reserved allocation in which a specific radio resource is reserved and used to guarantee the quality of real-time service, and the other is a shared allocation for the statistical multiplexing of non-real-time services. The service is classified according to the data property, the required quality of service, the traffic type. The class of each service is determined when the service is established.

A packet transmission allocation algorithm determines which one to use between the reserved allocation and the shared allocation, based on whether the service is of real-time or not. The service by the reserved allocation has a higher priority than the service by the shared allocation.

Hereinafter, the reserved allocation method is described in detail. For the service by the reserved allocation (i.e., reserved allocation service), the number of RRUs to be used is determined based on the required transmission rate, and the radio resources are selected from the radio resources that are not used for the other reserved allocation services. The required transmission rate and transmission time delay can be satisfied by using the reserved radio resources.

In case of a service of variable bit rate, the amount of resources required on service can be changed, and thus it can be larger or smaller than the amount of reserved resources when the service is initially established. When the required amount is larger than the reserved amount, part of resources that are used for the shared allocation method are additionally allocated for the service. To prevent the reserved allocation service from occupying all of the resources for the shared allocation by such additional packet transmission request, a lower priority than the original class is allocated to the additional packet transmission. When the required amount is smaller than the reserved amount, resources not used in the current frame are used for the shared allocation service. Then, in the next frame, they are used for the original reserved allocation service.

This reserved resource allocation method has following differences from that in a circuit-switched system. In the circuit-switched system, radio resources are allocated when the service is initially established and used exclusively during the whole service duration. However, in the reserved allocation of the present invention, the reserved resources can be used for another service, when the traffic amount is small. Also, it is possible to use other radio resources additionally based on the priority. That is, the reserved allocation of the present invention can secure a predetermined amount of radio resources as the circuit-switched system, but it has a difference in that the radio resources are not exclusive for the service but they can be used for another service.

If the user channel condition of the reserved allocation service is poor, higher transmission power is allocated to the packet transmission in order to satisfy the packet reception quality required by the service. If the available beam power is lower than the required power, the required power is reduced by using a transmission mode of a low transmission rate, that is, by using a low-order modulation and a low-code-rate coding. To the contrary, if the channel condition is good, lower power is allocated and the remained power is used for other services.

From now on, the shared allocation system is described in detail. For the service by the shared allocation method (i.e., shared allocation service), no radio resources are reserved when the service is established. The resources that are not used in the current frame are allocated to each packet transmission. The available radio resources include those allocated for reserved allocation services but not used.

Since no radio resource is reserved in the shared allocation service, the transmission rate allocated for each service is determined based on the transmission priority. That is, the service with a high transmission priority can use more radio resources, while the service with a lower priority use relatively less radio resources.

The transmission priority can be determined by diverse methods according to system requirements. For example, in case the transmission priority is determined based on the service classe, the high-class service has a higher priority. Accordingly, a high transmission rate is provided the high-class service. For the low-class service, a relatively low transmission rate is provided.

When a high priority is given to service having a large pilot SIR based on the pilot measurement report from the user in order to give a high priority to the user on good channel conditions, more radio resources are allocated to the service for the user on good channel conditions. Accordingly, the user is provided a high transmission rate, while the user on poor channel conditions is provided a relatively low transmission rate.

To improve the quality of service, a high transmission priority can be given to a waiting packet close to a maximum tolerable delay.

In case a certain beam is lack of radio resources but has surplus power, a high-rate transmission mode is allocated to the user on good channel conditions. From this, some available radio resources can be obtained. The available radio resources can be used to transmit packets additionally and thus to increase the beam transmission rate. This happens when there is a large traffic and the channel condition is good. The beam transmission rate is increased by using a high-rate transmission for the service on good channel conditions. To the contrary, if a beam has sufficient amount of radio resources but it is lack of power, a transmission mode of low transmission rate is used for reducing the power required for packet transmission.

As shown above, in the shared allocation, radio resources are adaptively allocated according to the packet transmission priority that is determined based on the service classe, the channel conditions and the packet waiting delay.

Hereinafter, a beam pilot report and transmission path gain are described. Every mobile stations estimates the received power and SINR of beam pilot signals and reports them to the central station.

When the service is initially established, the central station selects a primary beam and secondary beams for each user based on the reported pilot SINR. The primary beam and the secondary beams are defined as an active beam set for the user service. A beam having the largest pilot SINR becomes a primary beam, and a beam whose beam pilot SINR is less than the pilot SIR of the primary beam but within a predetermined range with respect to the primary pilot SINR becomes a secondary beam. That is, the primary beam of user u is a beam that satisfies the condition of Equation 1, which is shown below.

$$B_{u,primary} = \arg_b \max\{\gamma_{b,u,pilot}\} \quad \text{Eq. 1}$$

where $\gamma_{b,u,pilot}$ denotes the received pilot, SINR of beam b, which is reported from a user u.

Secondary beams are a set of beams satisfying the condition of Equation 2.

$$B_{u,secondary} = \{b | \gamma_{b,u,pilot} \geq \lambda_{active} \gamma_{u,primary}\} \quad \text{Eq. 2}$$

where $\gamma_{u,primary}$ denotes the received pilot SINR of the primary beam of the user u, and $\lambda_{active}$ denotes a pilot SINR threshold value ($\lambda_{active} < 1$) used to select the active beam set.

Accordingly, the active beam set $B_{u,active}$ of the user is defined as Equation 3.

$$B_{u,active} = B_{u,primary} \cup B_{u,secondary} \quad \text{Eq. 3}$$

After the service is established, the user estimates the received pilot power for the primary and secondary beams, and then periodically reports it to the central station. The user periodically reports the received pilot SINR, too. The reported pilot SINR during the service is used for updating the primary and secondary beams for the user in the same method of selecting the primary and secondary beams in the initial establishment of the service.

The central station estimates the path gain between the user and each beam by using the reported pilot power of the primary and secondary beams, and then uses it for radio resource allocation. Since the central station knows how much transmission power is used for transmitting the pilot signal of each beam, the path gain $g_{b,u}$ between beam b and user u can be estimated as Equation 4.

$$\tilde{g}_{b,u} = P_{b,pilot} / \hat{P}_{b,u,pilot}, \text{ for } b \in B_{u,active} \quad \text{Eq. 4}$$

where $P_{b,pilot}$ denotes the pilot transmission power of beam b, and $\hat{P}_{b,u,pilot}$ denotes the received pilot power of beam b at the user U.

The path gain includes path loss in a transmission link, fading, satellite antenna gain, and user antenna gain. It is an average value over one or more frames.

The report message from the user does not include the received pilot power for the beams that do not belong to the active beam set $B_{u,active}$. Therefore, the central station estimates the path gains for the beams that do not belong to the active beam set $B_{u,active}$ by using the estimated path gain of the primary beam, as shown in Equation 5 below.

$$\tilde{g}_{b,u} = x \lambda_{active} \tilde{g}_{u,primary}, \text{ for } b \notin B_{u,active} \quad \text{Eq. 5}$$

where $\hat{g}_{u,primary}$ denotes the estimated path gain for the primary beam of the user u, and x denotes a parameter (for example, x=1) for estimating the path gains of beams not belonging to the active set.

Since the received pilot SINR and reception power reported from the user are average values obtained over one or more frames, the fast fading of the channel is averaged out. Therefore, the estimated path gain means an average value for path loss and fading.

Hereinafter, a method for determining a packet transmission priority is described. Firstly, the packet transmission allocation algorithm allocates radio resources to the packets of reserved allocation services. Then, it allocates for the packets of reserved allocation services exceeding to the reserved amount, and for the packets for shared allocation services. The retransmission packets, which are transmitted by the automatic repeat request (ARQ), have a higher priority than the packets that are newly transmitted. Therefore, radio resources are first allocated to the retransmission packets of the reserved allocation service, and then allocated to new transmission packets of the reserved allocation service, retransmission packets of the shared allocation service, additional packets of the reserved allocation service, and new transmission packets of the shared allocation service, in the mentioned order. This allocation order, however, can be changed by the decision of the system operator. Since most of the reserved allocation services are real-time services, there may be no retransmission packet of the reserved allocation service.

To determine the transmission priority for the packets waiting in the transmission queue, the priority value of each packet is calculated by the following equation. A priority value $w_{u,k}$ of packet k for user u is calculated by Equation 6. For the sake of convenience in description, it is assumed that every user has only one service.

$$w_{u,k} = (c_u)^{a1} (\gamma_{u,pilot})^{a2} (1/\overline{\gamma}_{u,pilot})^{a3} (1 + t_{current} / t_{k,deadline})^{a4} \quad \text{Eq. 6}$$

where $c_u$ denotes a service class of the user u, $\gamma_{u,pilot}$ denotes a received pilot SINR of a primary beam for the user u, $\overline{\gamma}_{u,pilot}$ denotes a average pilot SINR value of the primary beam for the user u, $t_{current}$ denotes current time, $t_{k,deadline}$ denotes maximum tolerable waiting time of packet k required for satisfying the quality of service, and The exponents of a1, a2, a3, and a4, which are arbitrary positive real numbers, are parameters for controlling the dependency of each component in determining the packet transmission priority.

For example, when a1=1, a2=0, a3=0, and a4=0, the packet transmission priority is determined only by the service class. If a1=0, a2=1, a3=0, and a4=0, it is determined by the pilot SINRs reported from the users. The packets for the users on good channel conditions have high priorities. In case where a1=0, a2=1, a3=1, and a4=0, the channel conditions of the users are improved and, thus, a high priority is given to a user having a current pilot SINR larger than the average pilot SINR, which happens when the channel conditions of the user are improved. If a1=0, a2=0, a3=0, and a4=1, it means that only packet transmission delay is considered. So, the highest priority is given a packet which is closest to the maximum tolerable waiting time, i.e., deadline, within which the packet should be transmitted to satisfy the packet transmission delay required by the service. If a1=1, a2=2, a3=2, and a4=1, all the service class, channel conditions and transmission delay are considered. However, the priority is determined giving weight to the channel conditions.

As described above, various types of packet scheduling considering service quality and channel conditions are allowed.

After the priorities are calculated for the packets at the head of each service queue, a packet (u*,k*) having the highest priority value is first selected for radio resource allocation, by Equation 7 below.

$$(u^*, k^*) = \arg\max_{(u,k)} w_{u,k} \qquad \text{Eq. 7}$$

In order of the priority, radio resources to be used for each selected packet are allocated. In order to maximize the system capacity and throughput, the allocation algorithm searches for a beam, a frequency slot, a time slot and a spreading code that require the lowest transmit power to transmit the selected packet, by using the interference and channel conditions of the user. To allocate the lowest power leads to a minimum interference between the packets transmitted in the same slot. Therefore, a maximum number of the packets can be transmitted using limited power and resources.

To describe a method for selecting radio resources, a SINR per transmission symbol received at a user is defined by the following equation.

When a packet is transmitted to a user u by using a radio resource (b, s, l, m), which means a frequency slot s, time slot l, and a spreading code m in a beam b, the average received SINR $\gamma_{u,(b,s,l,m)}$ of the user is expressed as Equation 8, $$\gamma_{u,(b,s,l,m)} = SF \frac{p_{(b,s,l,m)} g_{b,u}}{I_{b,u,(s,l)} + Z_{b,u,(s,l)} + N_{noise}}, \text{ for } (b, s, l, m) \in V \qquad \text{Eq. 8}$$

where V denotes a set of RRUs,

SF denotes a symbol spreading factor, $P_{(b,s,l,m)}$ denotes transmission power allocated to the RRU (b, s, l, m) ($P_{(b,s,l,m)} \geq 0$), $g_{b,u}$ denotes a path gain between the beam b and the user u ($g_{b,u} < 1$), $I_{b,u,(s,l)}$ denotes intra-beam interference received by the user u from the beam b at frequency/time slot (s,l), $Z_{b,u,(s,l)}$ denotes the inter-beam interference received by the user u from a beam other than the beam b at frequency/time slot (s,l), and $N_{noise}$ denotes background noise power.

The symbol spreading factor (SF) is defined by the number of chips used for spreading and transmitting a modulated symbol by using an orthogonal code. In short, it means a spread gain. When a transmission rate of modulated symbols is $R_S$ and the chip transmission rate after spreading is $R_C$, the relationship between them is expressed as $SF=R_C/R_S$.

The intra-beam interference $I_{b,u,(s,l)}$ is the interference generated from the packets which are transmitted using spreading codes different from the code m of the RRU (b,s,l,m) in the same frequency/time slot (s,l) of the beam b. The inter-beam interference $Z_{b,u,(s,l)}$ is the interference generated from the other packets which are transmitted in the same frequency/time slot of beams other than the beam b. The intra-beam interference and the inter-beam interference are expressed as Equations 9 and 10.

$$I_{b,u,(s,l)} = k_1 \sum_{(b,s,l,i) \in V_{(b,s,l)}, i \neq m} p_{(b,s,l,i)} g_{b,u} \qquad \text{Eq. 9}$$

$$Z_{b,u,(s,l)} = k_2 \sum_{j \in B, j \neq b} \sum_{(j,l,s,i) \in V_{(j,s,l)}, i \neq m} p_{(j,s,l,i)} g_{j,u} + k_3 \sum_{j \in B, j \neq b} p_{(j,s,l,m)} g_{j,u} \qquad \text{Eq. 10}$$

Where B denotes the set of multibeam in the system, $V_{(b,s,l)}$ denotes the RRU set that belongs to the frequency slot/time slot (s,l) of the beam b, and $k_x$ denotes an interference parameter (x=1, 2, 3).

In Equations 9 and 10, if no packet is transmitted substantially in RRU (b', s', l', m'), a transmit power of $P_{(b', s', l', m')}$ is zero. The interference parameters $k_1$, $k_2$, $k_3$ of Equations 9 and 10 are determined as follows.

In the aspect of using spreading codes, systems are classified into two types. One is a system that uses different PN scrambling codes among the beams and then discriminates the signals transmitted in the same slot of the same beam by using orthogonal spreading codes. The other is a system that uses the same PN scrambling code in all beams and shares orthogonal spreading codes among the beams.

In both systems, different interference parameters are considered for the intra-beam or inter-beam interference. In principle, the signals using different orthogonal spreading codes do not generate interference to each other due to the orthogonality between codes. However, the orthogonality between different codes may be vanished by multipath propagation in an actual channel.

In the system where different PN codes are used among beams, the intra-beam interference generated by the signals from the same beam using different orthogonal codes depends on how much the signals looses its orthogonality due to the multipath propagation, and the inter-beam interference generated by the signals from other beams using different PN codes depends on the correlation of the PN scrambling codes. When the interference parameter between the orthogonal codes is referred to as $k_{OC}$ and the interference parameter between the PN codes is $k_{PN}$, the interference parameters in Equation 10 are expressed as Equation 11.

$$k_1 = k_{OC}, k_2 = k_3 = k_{PN} \qquad \text{Eq. 11}$$

In the system where orthogonal codes are shared among beams, both intra-beam interference and inter-beam interference are generated by the loss of their orthogonality. If the same spreading code is re-used in another beam, spread gain by the spreading code is not secured. Thus, $k_{SC}$ becomes equal to SF ($k_{SC}$=SF). The interference parameters of this system are written as Equation 12.

$$k_1 = k_2 = k_{OC}, k_3 = k_{SC} \qquad \text{Eq. 12}$$

Generally, a value of $k_{SC}$=SF is used as the interference factor caused by the use of the same code, and a value of $k_{PN}$=1 is used as the interference factor caused by the use of different PN codes. The interference factor between orthogonal codes is set up according to the multipath propagation property of the channel, and if $k_{OC}$=0.5, it means that on the average 50% of power leads to the interference because of the multipath propagation.

To satisfy a packet receiving quality requested by the user service (for example, packet error probability <0.1), the SINR per symbol should be equal to or more than a threshold value $\gamma_u^*$. Therefore, the minimum transmission power for the SINR on the RRU in Equation 8 to satisfy $\gamma_{u,(b,s,l,m)} \geq \gamma_u^*$, can be obtained by Equation 13.

$$p_{(b,s,l,m)} = \frac{\gamma_u^* / SF}{\phi_{u,(b,s,l,m)}} \quad \text{Eq. 13}$$

where $\phi_{u,(b,s,l,m)}$ denotes a gain-to-interference-and-noise ratio (GINR) on the RRU (b,s,l,m) which is used for packet transmission to user u.

The GINR $\phi_{u,(b,s,l,m)}$ is defined as Equation 14.

$$\phi_{u,(b,s,l,m)} = \frac{g_{b,u}}{I_{b,u,(s,l)} + Z_{b,u,(s,l)} + N_{noise}} \quad \text{Eq. 14}$$

As shown in Equation 13, an optimum RRU for transmitting a packet is the RRU having the largest GINR, given the required SINR and the spreading factor. Therefore, for each user packet, the radio resources to be used for packet transmission are selected by performing the following processes.

First, the number of RRUs requested for transmitting a selected packet is determined. The packet length may be different according to the service properties and the amount of data included in the packet. The number of RRU $N_{rru,k}$ is determined by Equation 15.

$$N_{rru,k} = \lceil L_{pkl,k} / L_{basic} \rceil \quad .15$$

wherein $L_{basic}$ denotes the number of bits that can be transmitted in a RRU when a basic transmission mode is used, and $\lceil y \rceil$ represents the smallest integer which is larger than or equal to y.

Next, $N_{rru,k}$ RRUs having the largest GINR are selected by Equation 16.

$$(b^*, s^*, l^*, m^*) = \underset{(b,s,l,m) \in V}{\operatorname{argmax}} \tilde{\phi}_{u,(b,s,l,m)} \quad \text{Eq. 16}$$

for $b \in B_{u,active}$ or $b = B_{u,primary}$

In computing the GINR of Equation 16, the path gains for beams estimated by Equations 4 and 5 are used, as shown in Equation 17.

$$\tilde{\phi}_{u,(b,s,l,m)} = \frac{\tilde{g}_{b,u}}{\tilde{I}_{b,u,(s,l)} + \tilde{Z}_{b,u,(s,l)} + N_{noise}} \quad \text{Eq. 17}$$

where $\tilde{I}_{b,u,(s,l)} = k_1 \sum_{(b,s,l,i) \in V_{(b,s,l)}, i \neq m} p_{b,s,l,i} \tilde{g}_{b,u}$, $\tilde{Z}_{b,u,(s,l)} = k_2 \sum_{j \in B_b, j \neq b} \sum_{(j,s,l,i) \in V_{(j,s,l)}, i \neq m} p_{(j,s,l,i)} \tilde{g}_{j,u} +$ $k_3 \sum_{j \in B_b, j \neq b} p_{(j,s,l,m)} \tilde{g}_{j,u}$, and $B_b$ denotes the set of beams adjacent to beam b, Since to find a RRU having the largest GINR requires a great amount of computation when the RRUs of all beams are considered, a set of beams considered in the radio resource selection is restricted within the active beam set of the user (i.e., $b \in B_{u,active}$) or to the primary beam of the user (i.e., $b \in B_{u,primary}$). Also, a set of interfering beams is restricted to the set $B_b$ neighboring the service beam in order to reduce the number of interfering beams considered in the GIR calculation for each RRU. For example, if it is assumed that a hexagonal service cell is serviced by a beam, there are six neighboring beams around a service beam. Practically, since the interference from the adjacent beams facing with the service beam is dominant, this method is quite reasonable.

When a RRU is selected by Equation 16, radio resources already used for the transmission of different packets or the same packet are excluded from the selection. In addition, in the system sharing the orthogonal codes among beams, only RRUs that satisfy Equation 18 are selected in order to avoid using the same orthogonal spreading code among the close adjacent beams.

$$\lambda_{SC} \geq \frac{\tilde{Z}_{b,u,(s,l,m)}}{\tilde{I}_{b,u,(s,l)} + \tilde{Z}_{b,u,(s,l)}} \quad \text{Eq. 18}$$

where $\tilde{Z}_{b,u,(s,l,m)}$ denotes the interference from other beams using the same code in the same frequency/time slot, which is defined as:

$$\tilde{Z}_{b,u,(s,l,m)} = k_3 \sum_{j \in B_b, j \neq b} p_{(j,s,l,m)} \tilde{g}_{j,u}.$$

The above condition of Equation 18 means that the same code is re-used only when the ratio of the same code interference to total interference is less than a particular level.

From now on, the assignment of transmission power is described. After the RRUs to be used for each packet transmission are selected, the transmission power required for each RRU is computed. To minimize the interference and thereby maximize the transmission rate of the system, a minimum power satisfying the required packet reception quality should be used. To obtain the minimum transmission power, a method based on repetition, which is similar to a Distributed Power Control Algorithm (DPCA), is used. The DPCA is suggested in "Jeans Zander and S. L. Kim, Radio Resource Management for Wireless Networks, Artech House Publisher, 2001" to control transmission power of a user in a reverse link of a CDMA system.

The transmission power allocation method of the present invention may be similar to DPCA. However, there are the following differences between the two.

In the conventional method, i.e., DPCA, each user controls its transmission power in the reverse link based on the power control command from a base station. The base station estimates a received SIR of each user signal, and transmits a command for controlling the transmission power of each user for the next time slot to the user. Then, the user controls its transmission power based on the power control command. However, in the method of the present invention where the transmission power of each packet in a forward link is calculated, the power is not controlled by the user itself, but the central station calculates the necessary power level. In case of the conventional method, a closed loop for power control between the base station and the user is repeated several times or scores of times to adjust the transmission power of each user to a proper level. To reach the proper level, it takes at least several or decades of the round trip delay between the base station and the user. Also, when the path gain of the channel changes rapidly, in the closed loop power control, the power level cannot converge. However, the method of the present invention has an advantage that the power control is performed directly by the central station itself, and thus, the proper level can be reached by the internal repetitive computation in the central station without any repetitive closed loop with the user.

The power levels for packet transmissions using RRUs in the same frequency/time slot are obtained by performing the calculation of Equation 19 repeatedly.

For $n=1,2,\ldots, N_{itr}-1$ $$p_{(b,s,l,m)}(n+1) = \gamma_u^* \frac{/SF}{\tilde{\phi}_{u,(b,s,l,m)}(n)}, (b, s, l, m) \in V_{(s,l)} \quad \text{Eq. 19}$$

where $N_{itr}$ denotes the repetition number,
$V_{(s,l)}$ denotes a set of RRUs belonging to a frequency/time slot (s,l), and $$\tilde{\phi}_{u,(b,s,l,m)}(n) = \frac{\tilde{g}_{b,u}}{\tilde{I}_{b,u,(s,l)}(n) + \tilde{Z}_{b,u,(s,l)(n)} + N_{noise}},$$

$$\tilde{I}_{b,u,(s,l)}(n) = k_1 \sum_{(b,s,l,i) \in V_{(b,s,l)}, i \neq m} p_{(b,s,l,i)}(n) \tilde{g}_{b,u}, \text{ and}$$

$$\tilde{Z}_{b,u,(s,l)}(n) = k_2 \sum_{j \in B_b, j \neq b} \sum_{(j,s,l,i) \in V_{(j,s,l)}, i \neq m} p_{(j,s,l,i)}(n) \tilde{g}_{j,u} + k_3 \sum_{j \in B_b, j \neq b} p_{(j,s,l,m)}(n) \tilde{g}_{j,u}.$$

In this method, it is possible to obtain a converged power level regardless of the initial power level by repeating the calculation no more than 10 times.

The transmission power allocation described above computes the power levels for all of the RRUs at the same frequency/time slot in the service and adjacent beams. Since the packets transmitted on the RRUs belonging to a different frequency/time slot do not cause interference, the packet transmission in a slot does not affect the requested transmission power in another slot. However, if the slot is the same even though the used beams are different, there is interference between packets. Accordingly, when transmission power for an RRU is changed in the same slot, the transmission power for another RRU should be changed to satisfy the reception quality.

Since the total transmission power is limited, the sum of transmission powers calculated in the above method should not exceed a maximum power allowed for each beam. That is, when the maximum power available for each beam is $P_{max}$, the sum of the transmission powers allocated in a time slot l of beam b should satisfy Equation 20, which is shown below.

$$\sum_{(b,s,l,m) \in V_{(b,l)}} p_{(b,s,l,m)} \leq p_{max} \quad \text{Eq. 20}$$

where $V_{(b,l)}$ denotes a set of RRUs belonging to the time slot l of the beam b.

Hereinafter, how a transmission mode is selected will be described. To transmit each packet adaptively, transmission modes having various transmission rates, as shown below, can be selected. Each of the transmission modes is a combination of a M-ary PSK or M-ary QAM modulation method and a coding method. Table 1 below shows the order of transmission modes.

TABLE 1

| Transmission Mode | Transmission Rate | Required Symbol SNR | Required Bit SNR | Example |
|---|---|---|---|---|
| MCS $R_{max}$ | High | High | High | 64-QAM |
| . | . | . | . | . |
| . | . | . | . | . |
| . | . | . | . | . |
| MCS $R_{basic}$ | Middle | Middle | Low | QPSK |
| . | . | . | . | . |
| . | . | . | . | . |
| . | . | . | . | . |
| MCS $R_{min}$ | Low | Low | Low | QPSK-4SR |

The order of the transmission modes can be determined as shown in Table 1 in the aspects of transmission rate and energy efficiency. In Table 1, the transmission rate stands for the transmission bit rate of each transmission mode when a symbol transmission rate is fixed, and the required symbol SNR denotes a signal-to-noise ratio per symbol, which is required for satisfying a predetermined bit error rate (BER). The required bit SNR means a signal-to-noise ratio per bit, which is required for satisfying the predetermined BER.

Among the transmission modes in Table 1, one having the lowest required bit SNR is used as a basic transmission mode. In Table 1, the basic transmission mode is denoted by MCS $R_{basic}$. If there are more than two transmission modes having the lowest required bit SNR, a transmission mode having the highest transmission rate among them becomes the basic transmission mode.

Since the transmission mode MCS $R_{max}$ in Table 1 requires a relatively high symbol SNR, a higher transmission power is required than for a transmission mode with a lower rate. The transmission mode MCS $R_{max}$, however, can support of the highest transmission rate. To the contrary, the transmission mode MCS $R_{min}$ requires a relatively low power, but it provides a low transmission rate. For example, the transmission modes of 64-QAM, 16-QAM, QPSK, QPSK-2SR, and QPSK-4SR in the order can be selected as the modulation modes in Table 1, QPSK-2SR and QPSK-4SR mean that a QPSK modulation symbol is repeated twice and four times, respectively, for high bit energy. By repeating a symbol and increasing the energy for each bit, a lower SNR is required for supporting the same BER. Thus, although the transmission bit rate is lowered, the required transmission power can be reduced. This transmission mode is used for obtaining an energy gain without any increase of the transmission power, when the channel condition is poor and the available power is not sufficient.

From now on, a packet transmission allocation process will be described in detail. The packet transmission allocation unit of the central station performs the allocation process according to the following process in order to transmit packets in each frame.

Figure 5:
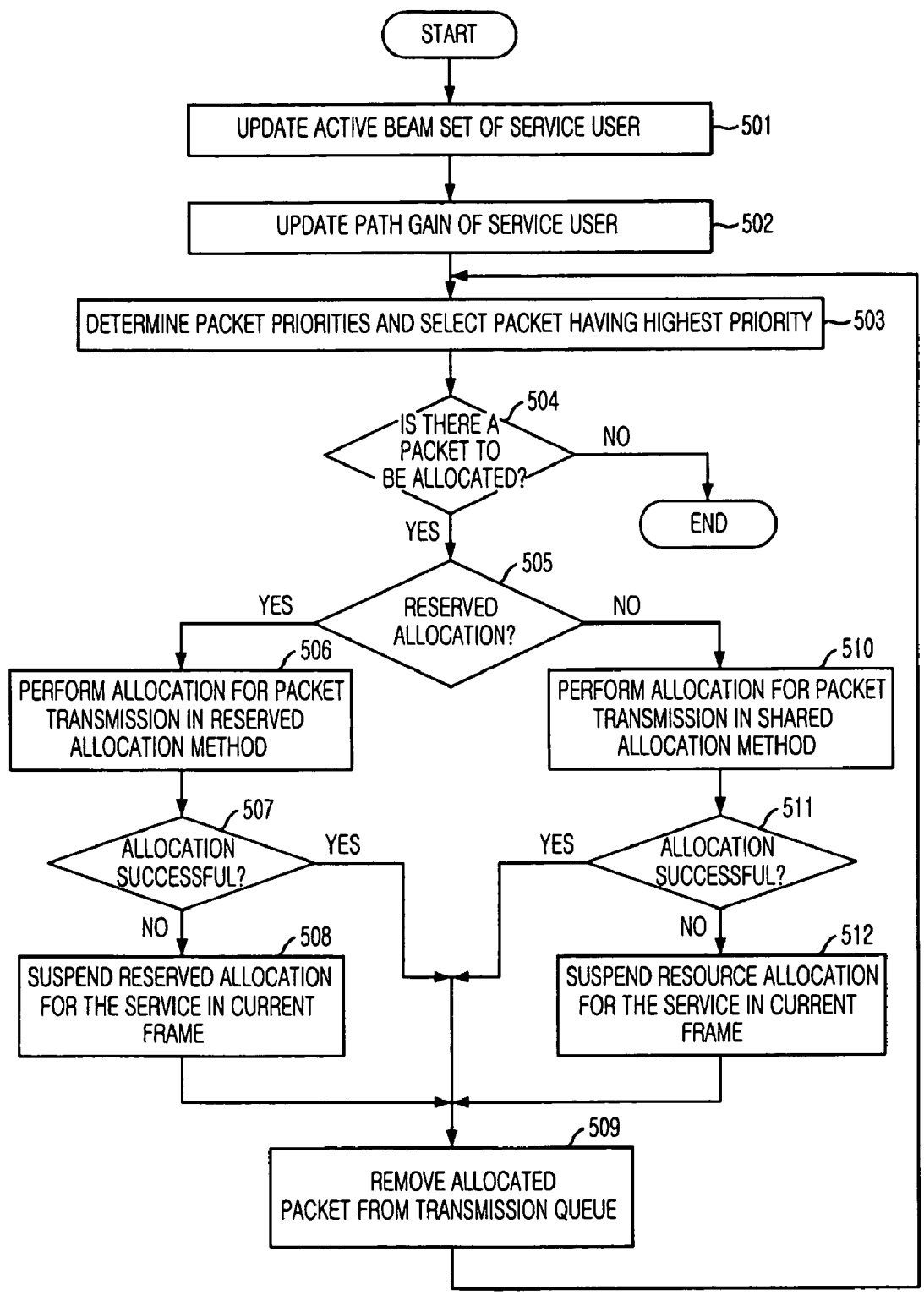
FIG. 5 is a flow chart describing a packet transmission allocation process in accordance with an embodiment of the present invention.

FIG. 5 is a flow chart describing a packet transmission allocation process in accordance with an embodiment of the present invention. First, at step S501, an active beam set for each user is updated based on the measurement report on beam pilot SINRs. Then, at step S502, the path gain for the user is updated based on the reported value of the received beam pilot power. The period for updating the active beam set and the path gain is the same as the period of the measurement report. The updating can be periodically performed at several frame intervals.

Subsequently, at step S503, transmission priorities for the packets in the head of the transmission queue for each service are determined. The priority is determined after the packets are classified into four groups as follows. Retransmission packets for reserved allocation services have the top priority. If there is no such packet, the allocation for new transmission packets for reserved allocation services is performed, retransmission packets for shared allocation services, and new transmission packets for shared allocation services, in the mentioned order.

For the packets in the same group, the priority is determined by Equation 6. Then, a packet having the highest priority is selected by Equation 7. If, for a service, it has failed to allocate radio resources in the current frame, the packets for the service are not considered in determining the transmission priority.

Subsequently, at step S504, it is determined whether there is a packet to be allocated in the process of determining the packet priority. If there is a selected packet, radio resources are allocated for the packet. Otherwise, the allocation process in the current frame stops and the process newly begins in the next frame.

If the packet is one for a reserved allocation service, at step S506, the radio resources are allocated by the reserved allocation method. If the packet is an additional transmission packet, which requires radio resources more than the reserved ones, or a packet for a shared allocation service, at step S510, the radio resources are allocated in the shared allocation method.

At step S507, if the radio resources for the packet are successfully allocated to the packets, at step S509, the packets corresponding to the allocated amount are removed from the transmission queue of the service. If the allocation by the reserved allocation method fails, at step S508, the reserved allocation for the service in the current frame is suspended. For the remaining packets, which are not allocated in the current frame, allocation is attempted again in the shared allocation method later. If the shared allocation fails, at step S512, no allocation attempt for the corresponding service is performed in the current frame any more. For other packets or other services, the allocation process is repeated until there is no packet to be allocated in the current frame.

Figure 6A:
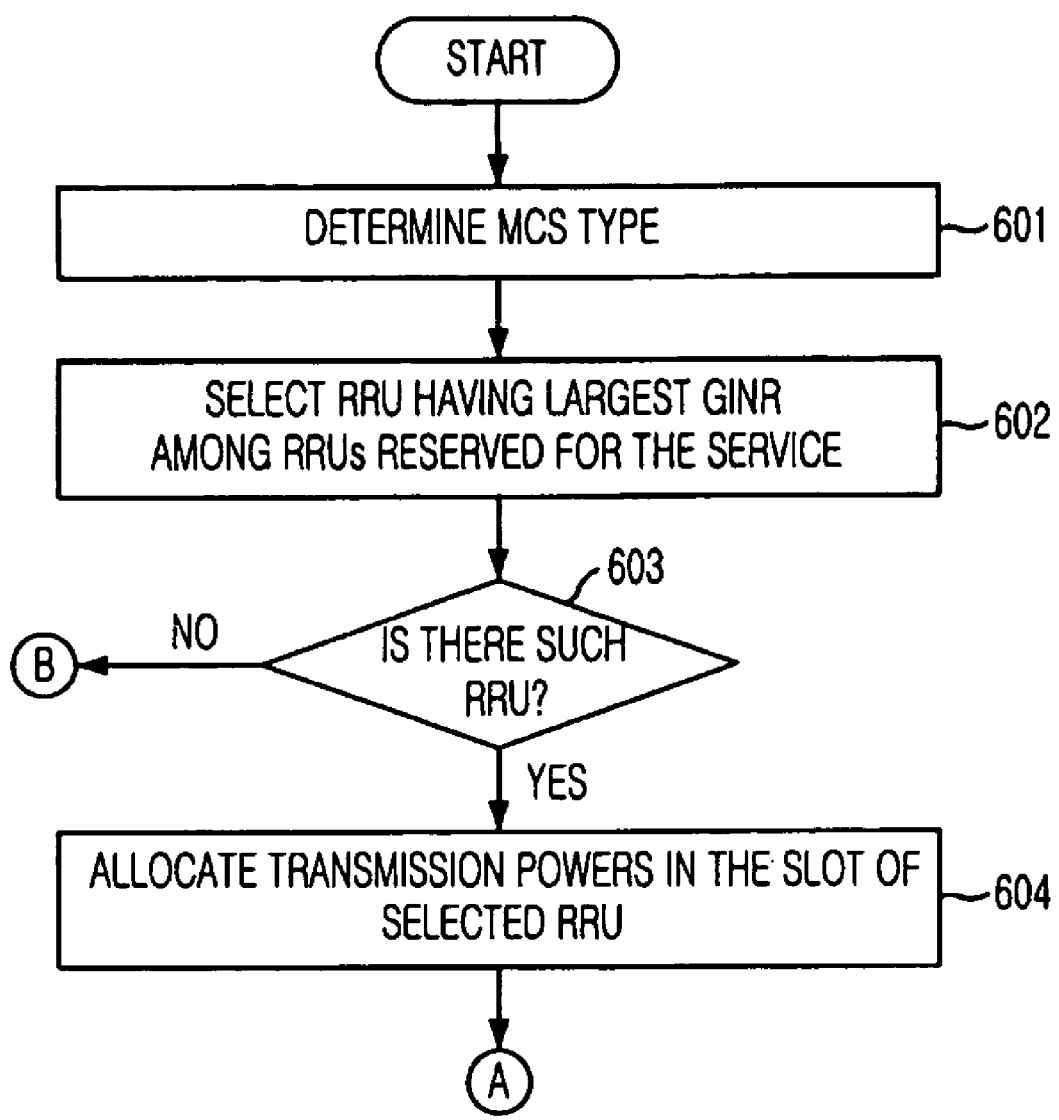
FIGS. 6A and 6B are flow charts describing a packet transmission allocation process adopting a reserved allocation mode in accordance with an embodiment of the present invention.
Figure 6B:
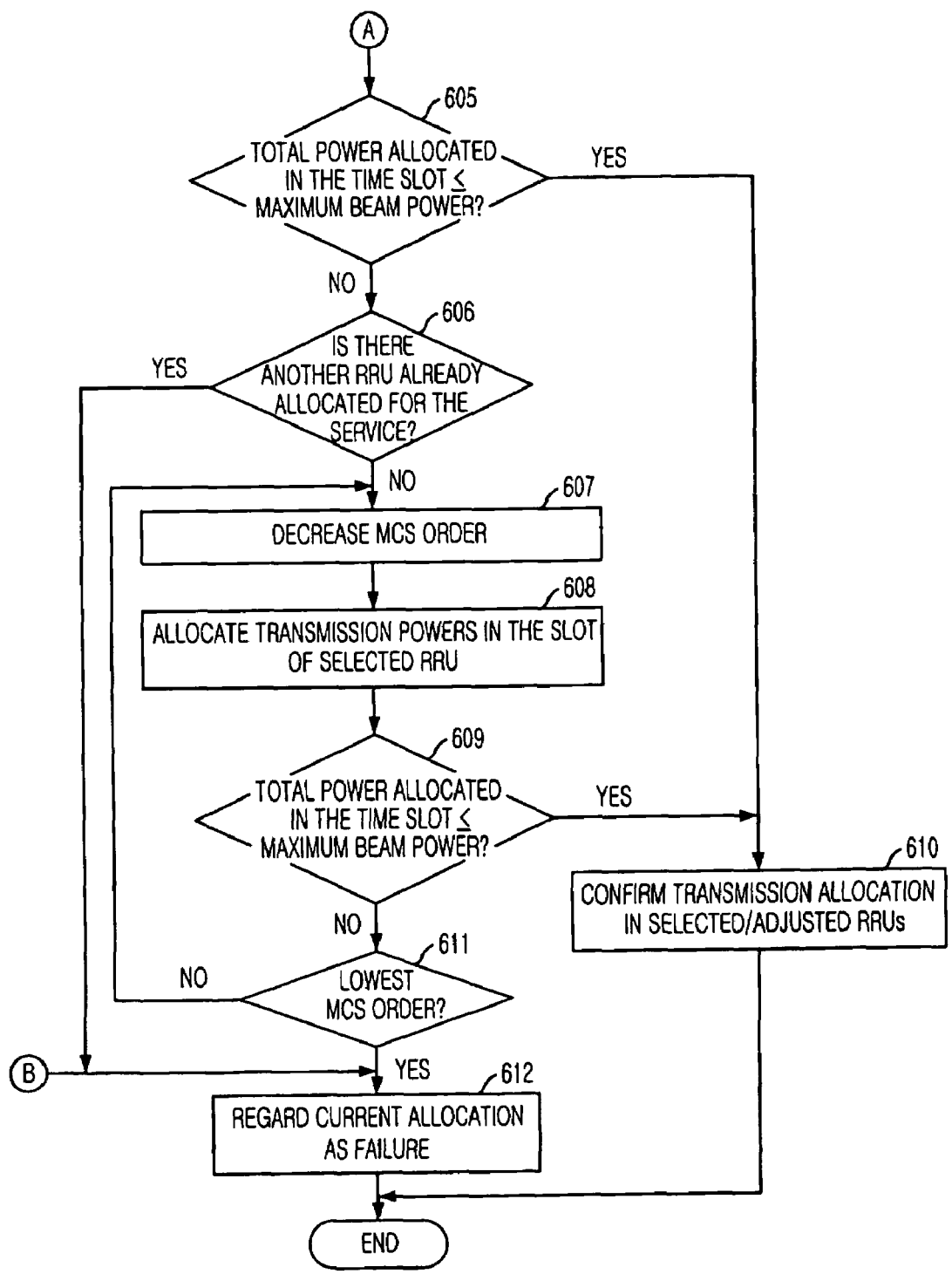

FIGS. 6A and 6B are flow charts describing the allocation process by the reserved allocation in accordance with an embodiment of the present invention. First, at step S601, an MCS type for packet transmission of the current service is decided. If, for the service that the packet belongs to, the allocation is performed for the first time in the current frame, a basic transmission mode is selected. For the next allocations after the first allocation, the MCS type selected in the first allocation is used. This is for using the same MCS type in transmitting the packets to a user in a frame. Although it is possible to use different transmission modes in a frame, using the same mode is good for alleviating the complexity in user receivers.

Subsequently, at step S602, an RRU having the largest GINR based on Equation 16 among the RRUs reserved for the service and not used yet is selected. If there is no such RRU, that is, if all the RRUs for the reserved service are used up, the allocation process for the service is considered as failed, and the allocation process by the shared allocation method is performed for the remaining packets.

Subsequently, at step S603, if there is the available RRU having the largest GINR, at step S604, the transmission powers for all of the used RRUs in the same frequency/time slot are determined by the algorithm of Equation 19, including the transmission power in the selected RRU.

At step S605, it is checked whether the sum of the transmission powers allocated for all of the RRUs in the same time slot, including the transmission power of the selected RRU, is equal to or less than the maximum beam power. If the condition is satisfied, at step S610, the transmission powers allocated for the RRUs in the same frequency/time slot are confirmed. That is, the RRU and power allocation for the current packet transmission is confirmed, and the transmission powers for the other RRUs in the same slot are adjusted. Since the transmission power allocated for the selected RRU will cause; an interference to the packet transmissions on other RRUs in the same slot, the transmission powers allocated for other RRUs are simultaneously changed by the transmission power allocation algorithm. When the current allocation is confirmed, the process also includes the change in the transmission powers allocated to other RRUs in the same slot. After this transmission power allocation, the process continues from the step S507 in FIG. 5.

In case where the maximum power condition is not satisfied, at step S607, the transmission rate is lowered by using another MCS with a lower order, in order to reduce the transmission power required for the packet transmission on the currently selected RRU. At step S606, if there is another RRU already used for the same service of the selected packet in the current frame, the power allocation by reducing the MCS order is not attempted because it is intended to use the same MCS for a service in a frame, and at step S612, the current allocation for the service in the current frame is regarded as failure, and the process returns to the step S507 in FIG. 5.

Although the maximum power condition is not satisfied, if it is the first allocation for the service in the current frame, at step S608, the MCS order is lowered to reduce the transmission rate used for the service in the current frame, and the transmission power allocation is performed. The MCS order reduction is repeatedly performed until the maximum power condition is satisfied.

At step S609, it is determined whether the maximum power condition is satisfied, and if it is satisfied, at step S610, the transmission power allocation for the selected RRU is confirmed, including the MCS order used for the service in the current frame, and then the process returns to the step S507 in FIG. 5. If the maximum power condition is not satisfied, at step S611, it is determined whether the MCS order is lowest. If the maximum power condition is not satisfied even at the lowest MCS order, at step S612, the reserved allocation for the service is regarded as failure, and the process returns to the step S507 in FIG. 5.

Figure 7A:
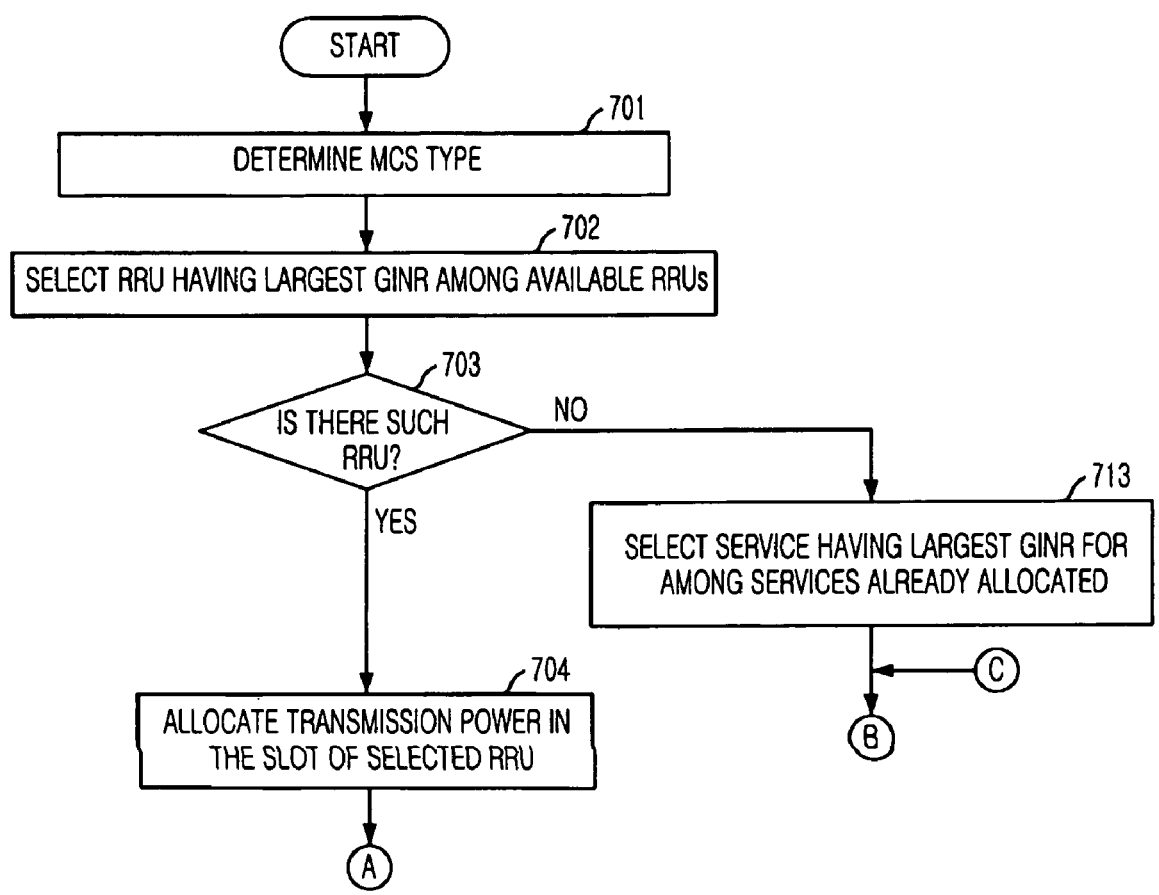
FIGS. 7A, 7B and 7C are flow charts illustrating a radio resource allocation process using a shared allocation mode in accordance with an embodiment of the present invention.
Figure 7B:
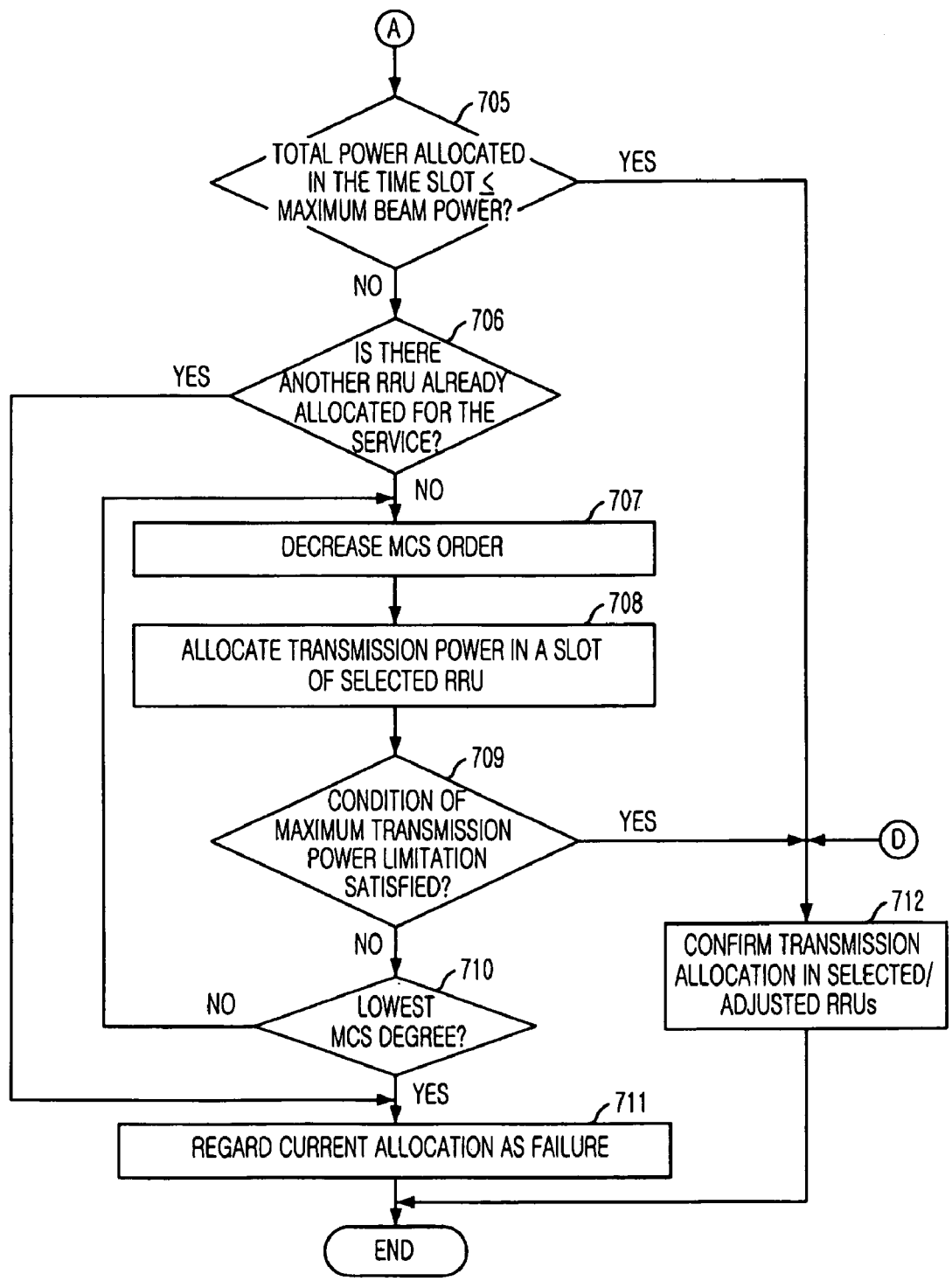
Figure 7C:
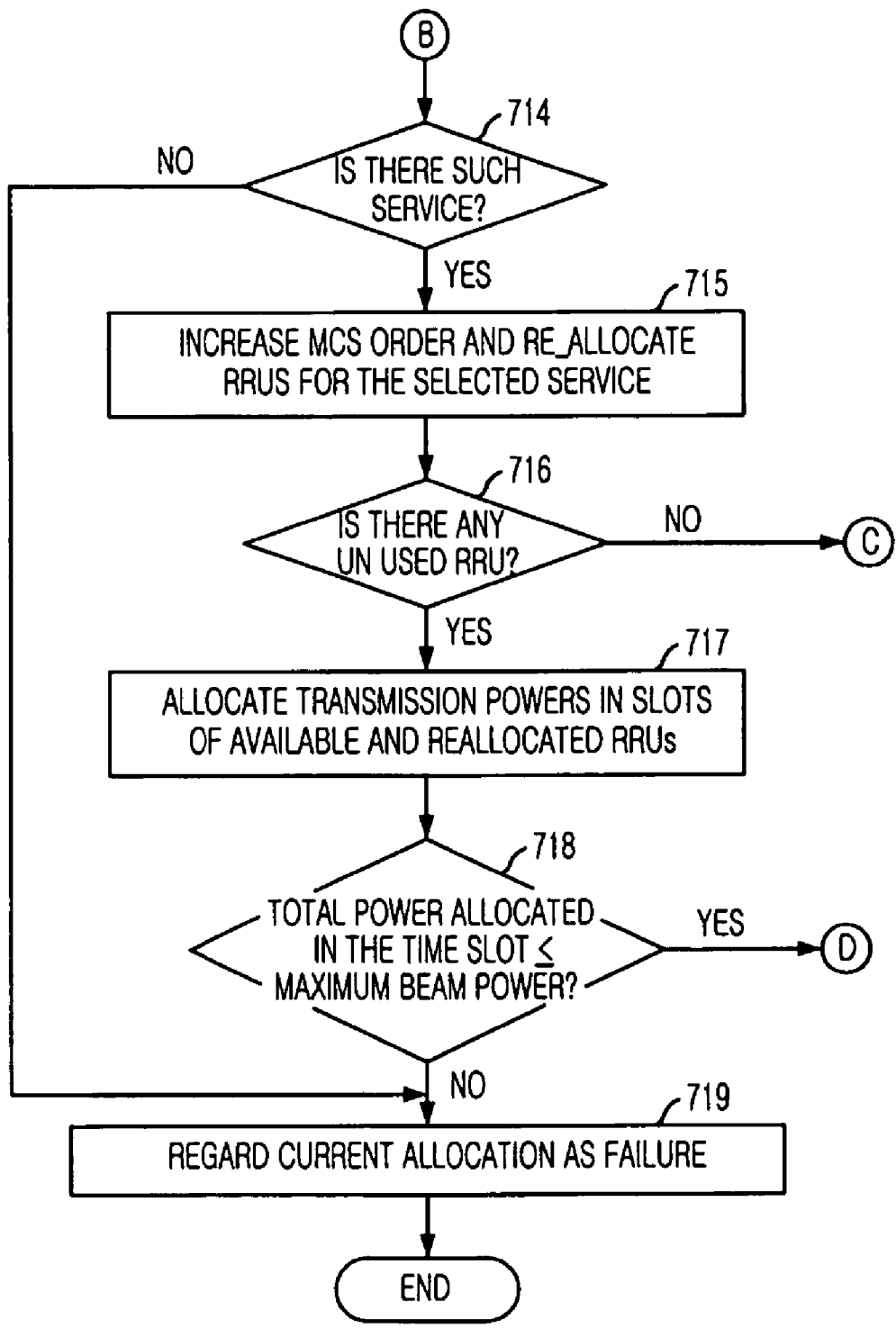

FIGS. 7A to 7C are flow charts illustrating a radio resource allocation process using a shared allocation method in accordance with an embodiment of the present invention. First, at step S701, an MCS type is decided, just as FIGS. 6A and 6B. If the allocation is performed for the first time for the packet service in the current frame, a basic transmission mode is selected. For the allocations after the first allocation, the MCS type determined in the first allocation is used.

Subsequently, at step S702, a RRU having the largest GINR is selected by Equation 16 among the RRUs available in the current frame. At step S703, if there is such RRU, at step S704, the transmission powers for all of the used RRUs in the same frequency/time slot are determined by Equation 19, including the transmission power in the selected RRU. At step S705, it is determined whether the sum of transmission powers used for RRUs in the time slot of the selected RRU exceeds the maximum beam power. If the maximum power condition is satisfied, at step S712, the transmission powers allocated for the RRUs in the time slot, including the transmission power for the selected RRU, are confirmed, and the process returns to the step S511 in FIG. 5.

If the maximum power condition is not satisfied, and at step S706, if the allocation is attempted for the first time for the service, at step S707, the allocation by decreasing the MCS order is performed. If there is an RRU already allocated for the service, at step S711, the allocation for the current packet is regarded as failure, and the process returns to the step S511 in FIG. 5.

At step S703, if there is no available RRU, a high-rate transmission mode is used in order to obtain unused radio resources. For this, at step S713, a service having the largest GINR but not the largest MCS order is selected. At step 714, if there is no such service, at step S719, the allocation for the current packet is regarded as failure, and the process returns to the step S511 in FIG. 5.

If there is such service, at step S715, the MCS order (that is, transmission rate) for the service with the largest GINR is increased, and the RRUs for the selected service are reallocated according to the increased MCS order. At step S716, it is checked if there are any unused RRUs obtained by increasing the MCS order for the selected service. The MCS order is increased until any unused RRU is obtained. If there is no available RRU until the MCS order reaches the maximum MCS order, at step S719, the allocation for the current packet is regarded as failure, and the process returns to the step S511 in FIG. 5.

If available RRUs can be obtained by increasing the MCS order, at step S717, transmission powers for the available RRU is allocated in order to allocate a transmission for the current packet, and the transmission powers for the RRUs in all of the slots, which the available RRU and the reallocated RRUs are included in, are reallocated. At step S718, it is determined whether the maximum power condition is satisfied. If it is satisfied, at step S712, the transmission powers in the RRU for transmitting the current packet, in the reallocated RRUs, and the RRUs in the slots which the available RRU and the reallocated RRUs are included in, are confirmed. Then, the process returns to the step S511 in FIG. 5. If the maximum power condition is not satisfied, at step S719, the allocation for the current packet is regarded as failure, and the process returns to the step S511 in FIG. 5.

In case of the system sharing the same spreading code set among beams, an additional confirmation process can be inserted after step S712 in FIG. 7A, in order to check if the reuse condition of the same code by Equation 18 is satisfied. In this case, if the RRU having the largest GINR does not satisfy the reuse condition of the same spreading code, the RRU is regarded as not available.

The present invention is summarized as follows. First, the transmission frame in the forward link is divided into three dimensions of frequency bands, time slots, and spreading codes, and it is shared between packet transmissions to users. The present invention provides a radio resource allocation method to select the divided radio resources according to channel conditions of each user so as to maximize the system transmission rate.

Also, when a packet is transmitted using the selected radio resources, the present invention provides a transmission power allocation method that maximizes the system transmission rate as well as satisfying the user requirements based on the channel conditions of each user.

The present invention provides a packet transmission allocation method that includes three processes; determining the transmission priorities of service packets and scheduling the packets; selecting radio resources for each, packet transmission; and allocating transmission power in the selected radio resources and transmission mode. By using such divided processes, radio resource allocation can be performed within a limited time.

To support realtime services as well as non-realtime services, the packet transmission allocation method of this invention provides both reserved allocation method and shared allocation method.

To use the limited radio resources efficiently, this invention provides a packet transmission allocation method that can select diverse transmission rates from low-speed to high-speed according to changes of the channel conditions and traffic.

Although the present invention mainly describes the packet transmission allocation method for the forward link in a multibeam satellite system, the allocation method of the present invention can be applied not only to reverse links but also to terrestrial cellular systems.

The method of the present invention can be embodied as a program and recorded in a computer-readable recording medium, such as CD-ROM, RAM, ROM, floppy disks, hard disks, optical-magnetic disks and the like.

The method of the present invention can minimize the interference between beams and provide high-speed packet transmission service effectively in a multibeam satellite communication system.

While the present invention has been described with respect to certain preferred embodiments, it will be apparent to those skilled in the art that various changes and modifications may be made without departing from the scope of the invention as defined in the following claims.

What is claimed is:

1. An adaptive packet transmission method in a cellular mobile communication system using a multibeam satellite, comprising the steps of:
    a) being periodically reported, from mobile stations, of average receiving power levels of beam pilot signals transmitted in a plurality of beams;
    b) estimating a path gain between beams and the mobile station based on the reported average power levels of beam pilot signals;
    c) determining priorities for packets to be transmitted to each of the mobile stations as a function of a service class, a received pilot signal-to-noise-and-interference ratio (SINR) of a primary beam, an average SINR value of the primary beam, a current time and a maximum tolerable waiting time of a packet;
    d) selecting a beam requiring the lowest transmission power for transmitting the packet having the highest priority, and allocating the lowest power required for satisfying a predetermined packet reception quality when the packet is transmitted in a selected radio resource, by using the path gain estimated for each of the mobile stations; and
    e) if the selected radio resource or the transmission power that can be used are not sufficient or if there is a packet to be allocated, performing the step c).

2. The method as recited in claim 1, wherein beams adjacent to the mobile station belong to an active beam set including a primary beam having the largest average received (SINR) of a pilot signal and a beam corresponding to a pilot signal whose pilot signal-to-noise-and-interference ratio is larger than or equal to a value obtained by multiplying a fixed rate smaller than 1 by the largest pilot SINR.

3. The method as recited in claim 1, wherein in the step b), the path gain between the mobile station and an adjacent beam is estimated based on a ratio of the pilot transmission power to the average received power of the pilot signal reported from the mobile station.

4. The method as recited in claim 1, wherein the radio resource is divided into a predetermined number of frames, wherein in a time domain, each frame is divided into one or more time slots, a beam signal is transmitted over multi-carrier; in a frequency domain, each frame is divided into one or more frequency slots, a signal is being transmitted over multiple subcarriers; and in a code domain, each frame is divided into one or more spreading codes, a signal is transmitted using a spreading code, and wherein each frame is divided by a combination of two or three of the frame division methods.

5. The method as recited in claim 1, wherein the packet allocation is performed based on service requirements, and the packet allocation includes reserved allocation and shared allocation, wherein in case of a service using the reserved allocation, radio resources required for transmitting the packet are allocated in each frame when the service is established initially, and if there is an additional packet to be transmitted, reserved radio resources are allocated by the shared allocation, and wherein the radio resources are selected among the radio resources that are not used for other reserved allocation services in the current frame.

6. The method as recited in claim 1, wherein in the step c), when the transmission priority for packet is determined, the radio resources are allocated in the order of high to low priority of the packet to be transmitted, the priority of each packet to be transmitted is calculated based on an equation as:

$$w_{u,k} = (c_u)^{a1}(\gamma_{u,pilot})^{a2}(1/\bar{\gamma}_{u,pilot})^{a3}(1+t_{current}/t_{k,deadline})^{a4}$$

wherein $c_u$ denotes the service class of the user u, $\gamma_{u,pilot}$ denotes a received pilot SINR of a primary beam for a user u, $\bar{\gamma}_{u,pilot}$ denotes an average (SINR) of the primary beam for the user u, $t_{current}$ denotes the current time, $t_{k,deadline}$ denotes the maximum tolerable waiting time of packet k required for satisfying the quality of service, and the exponents of a1, a2, a3 and a4, which are arbitrary positive real number, are parameters for controlling the dependency on the articles when the packet transmission priority is determined.

7. The method as recited in claim 6, wherein when the transmission priority is determined, the priority of the packet for the reserved allocation service has a larger value than the priority of the packet for the shared allocation service, and the priority of the packets, which are additionally requested other than the packets transmitted using the reserved radio resources in the reserved allocation service, is equal to the priority of the packet for the shared allocation service.

8. The method as recited in claim 7, wherein when the transmission priority is determined, the packet has a high priority in order of re-transmission packets for the reserved allocation service, new transmission packets for the reserved allocation service, re-transmission packets for the shared allocation service and new transmission packets for the shared allocation service.

9. The method as recited in claim 1, wherein the radio resources are used to transmit each packet, and a radio resource having the largest gain-to-interference ratio (GIR) is selected, the GIR is defined by an equation as:

$$\tilde{\phi}_{u,(b,s,l,m)} = \frac{\tilde{g}_{b,u}}{\tilde{I}_{b,u,(s,l)} + \tilde{Z}_{b,u,(s,l)} + N_{noise}}$$

wherein $\tilde{I}_{b,u,(s,l)} = k_1 \sum_{(b,s,l,i) \in V_{(B,S,L)}, i \neq m} p_{b,s,l,i} \tilde{g}_{b,u}$, $\tilde{Z}_{b,u,(s,l)} = k_2 \sum_{j \in B_b, j \neq b} \sum_{(j,s,l,i) \in V_{(j,s,l)}, i \neq m} p_{j,s,l,i} \tilde{g}_{j,u} + k_3 \sum_{j \in B_b, j \neq b} p_{(j,s,l,m)} \tilde{g}_{j,u}$, and $B_b$ denotes a set of beams adjacent to a beam b.

10. The method as recited in claim 9, wherein when considering a gain-to-interference-and-noise ratio (GINR), the radio resources are selected among the beams that belong to the active beam set or to the radio resources of a primary beam.

11. The method as recited in claim 9, wherein in order to calculate the GINR of the radio resources quickly, a set of interfering beams is restricted to a set of beams neighboring to the beams to which the radio resources belong.

12. The method as recited in claim 9, wherein if the same orthogonal spreading code is shared between the beams, the range of selectable radio resources is restricted to the radio resources that satisfy a condition of re-using an orthogonal code, the condition being expressed by an equation as:

$$\lambda_{SC} \geq \frac{\tilde{Z}_{b,u,(s,l,m)}}{\tilde{I}_{b,u,(s,l)} + \tilde{Z}_{b,u,(s,l)}}$$

wherein $\tilde{Z}_{b,u,(s,l,m)}$ denotes interference from other beams using the same code in the same frequency/time slot, which is defined as:

$$\tilde{Z}_{b,u,(s,l,m)} = k_3 \sum_{j \in B_b, j \neq b} p_{(j,s,l,m)} \tilde{g}_{j,u}$$

13. The method as recited in claim 1, wherein the transmission power is calculated repeatedly based on the power allocation method expressed by an equation as:

For $n=1,2,\ldots,N_{itr}-1$ $$p_{(b,s,l,m)}(n+1) = \gamma_u^* \frac{/SF}{\tilde{\phi}_{u,(b,s,l,m)}(n)}, \quad (b,s,l,m) \in V_{(s,l)}$$

wherein $N_{itr}$ denotes the repetition number, $V_{(s,l)}$ denotes a set of RRUs that belong to frequency/time slot (s,l), and $$\tilde{\phi}_{u,(b,s,l,m)}(n) = \frac{\tilde{g}_{b,u}}{\tilde{I}_{b,u,(s,l)}(n) + \tilde{Z}_{b,u,(s,l)}(n) + N_{noise}},$$

$\tilde{I}_{b,u,(s,l)}(n) = k_1 \sum_{(b,s,l,i) \in V_{(b,s,l)}, i \neq m} p_{b,s,l,i}(n) \tilde{g}_{b,u}$, and $\tilde{Z}_{b,u,(s,l)}(n) = k_2 \sum_{j \in B_b, j \neq b} \sum_{(j,s,l,i) \in V_{(j,s,l)}, i \neq m} p_{(j,s,l,i)}(n) \tilde{g}_{j,u} +$ $k_3 \sum_{j \in B_b, j \neq b} p_{(j,s,l,m)}(n) \tilde{g}_{j,u}$.

14. The method as recited in claim 1, wherein the transmission mode of radio resources is one selected from one or more transmission modes which are combinations of modulation mode and encoding mode; and the radio resources are allocated using one of the transmission modes as a basic transmission mode in a predetermined case, and if there are usable radio resources but the power is not sufficient to perform the basic transmission mode, a transmission mode having a low transmission rate is used to transmit the selected packet, or if the usable radio resources are not sufficient but the power can be used sufficiently, a transmission rate having a high transmission rate is used to obtain additional radio resources and transmit a packet selected by the additional radio resource to a user having the largest GIR.

15. The method as recited in claim 1, wherein the step b) includes the steps of:
   b1) updating the active beam set for each user based on the measurement report on pilot SINR transmitted from each user periodically, and updating the path gain for each user based on the reported pilot signal power;
   b2) giving a packet transmission priority value in the order of a group of re-transmission packets for the reserved allocation service, a group of new transmission packets for the reserved allocation service, a group of re-transmission packets for the shared allocation service, and a group of additional transmission packets for the reserved allocation service and new transmission packets for the shared allocation service, calculating priority values for the packets in the same group except the packets belonging to a service for which radio allocation attempt is failed in the current frame, and selecting a packet having the largest priority value;
   b3) if no packet is selected, stopping the radio resource allocation process in the current frame, or if there is a selected packet and the selected packet is for the reserved allocation service, allocating radio resources in the reserved allocation method to transmit the selected packet;
   b4) if there is a selected packet and the selected packet is a packet requesting additional packet transmission which requires more radio resources than the reserved radio resources or if the selected packet is for the shared allocation service, allocating radio resources in the shared allocation method to transmit the selected packet;
   b5) if the radio resources are allocated successfully, ruling out the packet corresponding to the allocated transmission amount from subsequent allocations, and performing the step b2);
   b6) if the radio resources allocation in the reserved allocation method is failed, not attempting the radio resource allocation for the service any more in the current frame, and performing the step b2); and
   b7) if the radio resources allocation in the shared allocation method is failed, not attempting the radio resource allocation for the service any more in the current frame, and performing the step b2, wherein the priority of the packet is calculated based on an equation expressed as:

$$w_{u,k} = (c_u)^{a1} (\gamma_{u,pilot})^{a2} (1/\overline{\gamma}_{u,pilot})^{a3} (1 + t_{current}/t_{k,deadline})^{a4}$$

where $c_u$ denotes a service class of the user u,
   $\gamma_{u,pilot}$ denotes a received pilot SINR of a primary beam for the user u,
   $\overline{\gamma}_{u,pilot}$ denotes a average pilot SINR value of the primary beam for the user u,
   $t_{current}$ denotes current time,
   $t_{k,deadline}$ denotes maximum tolerable waiting time of packet k required for satisfying the quality of service, and
   the exponents of a1, a2, a3 and a4, which are arbitrary positive real number, are parameters for controlling the dependency of each component when determining the packet transmission priority.

16. The method as recited in claim 15, wherein the step b4) includes the steps of:
   b4-1) if the allocation is performed for the first time for the service to which the packet selected in the current frame belongs, using the transmission mode selected for the service as a basic transmission mode, or if the allocation for the transmission of packet is not the first allocation, using the transmission mode selected in the prior allocation;
   b4-2) selecting a radio resource having the largest GINR and not allocated yet among the radio resources reserved for the service of the selected packet;
   b4-3) if there is no such radio resources having the largest GIR and not allocated yet, regarding the reserved allocation for the selected packet as a failure, and attempting allocation for the packets which are not allocated for the service according to the subsequent radio resource allocation by the shared allocation method;
   b4-4) if there is the radio resource having the largest GINR and not allocated yet, establishing the transmission power for the radio resource that belongs to the same slot as the selected radio resource but already allocated, including the transmission power for the selected radio resource;
   b4-5) checking if the sum of total power allocated in the time slot, which includes the transmission power for the selected radio resource and the transmission power allocated for other radio resources belonging to the same time slot as the selected radio resource, is not more than the maximum available power;
   b4-6) if the sum of the total power allocated in the time slot is not more than the maximum power, confirming the selected radio resource allocated for the transmission of the selected packet and the change in the transmission power for the existing radio resources that belong to the same slot as the selected radio resource;
   b4-7) if the sum of the total power allocated in the time slot exceeds the maximum power and another radio resource is already allocated for the service in the current frame, not attempting to allocate any radio resource for the service in the current frame;
   b4-8) if the sum of the total power allocated in the time slot exceeds the maximum power and the allocation is performed for the first time in the current frame for the service, establishing the transmission power for the radio resource that belongs to the same slot as the selected radio source and is allocated already, including the transmission power for the selected radio resource, in consideration of using a transmission mode having a low transmission rate as a transmission mode for the service in the current frame temporarily;
   b4-9) checking whether the sum of the total power allocated in the time slot, which includes the transmission power for the selected radio resource and the transmission power allocated for another radio resource that belongs to the same time slot as the selected radio resource, is not more than the maximum available power, performing the step b4-8) until the summation is not more than the maximum power or radio resources are allocated in a transmission mode having the lowest transmission rate available;
   b4-10) if the sum of the total power allocated in the time slot is not more than the maximum power in the step b4-9), confirming the transmission mode and power selected by the selected radio resource, and the transmission power for the radio resource that belongs to the same slot as the selected radio resource and is already allocated; and
   b4-11) if the sum of the total power allocated in the time slot is more than the maximum power even in the transmission mode having the lowest transmission rate available in the step b4-9), not attempting to allocate any radio resource for the service in the current frame.

17. The method as recited in claim 15, wherein the step b5) includes the steps of:
- b5-1) if the allocation is performed for the first time for the service to which the packet selected in the current frame belongs, using the transmission mode selected for the service as a basic transmission mode, or if the allocation is not the first allocation for the service to which the Packet selected in the current frame belongs, using the transmission mode selected in the prior allocation;
- b5-2) selecting a radio resource having the largest GIR and not allocated yet among the radio resources available in the current frame;
- b5-3) if there is the radio resource having the largest GINR and not allocated yet, establishing the transmission power for the radio resource that belongs to the same slot as the selected radio resource but is already allocated, including the transmission power for the selected radio resource;
- b5-4) checking if the sum of the total power allocated in the time slot, which includes the transmission power for the selected radio resource and the transmission power allocated for another radio resource that belongs to the same time slot as the selected radio resource, is not more than the maximum available power;
- b5-5) if the sum of the total power allocated in the time slot is not more than the maximum power, confirming the selected radio resource allocated for the transmission of the selected packet and the change in the transmission power for the existing radio resources that belong to the same slot as the selected radio resource;
- b5-6) if the sum of the total power allocated in the time slot exceeds the maximum power and another radio resource in the current frame is already allocated for the service, not attempting to allocate a radio resource any more in the current frame for the service;
- b5-7) if the sum of the total power allocated in the time slot exceeds the maximum power and the allocation is performed for the first time in the current frame for the service, establishing the transmission power for the radio resource that belongs to the same slot as the selected radio source and is allocated already, including the transmission power for the selected radio resource, in consideration of using a transmission mode having a low transmission rate as a transmission mode for the service in the current frame temporarily;
- b5-8) checking whether the sum of the total power allocated in the time slot, which includes the transmission power for the selected radio resource and the transmission power allocated for another radio resource that belongs to the same time slot as the selected radio resource, is not more than the maximum available power, and performing the step b5-7) until the sum of the total power allocated in the time slot is not more than the maximum power or radio resources are allocated in a transmission mode having the lowest transmission rate available;
- b5-9) if the sum of the total power allocated in the time slot is not more than the maximum power in the step b5-8), confirming the transmission mode and power selected by the selected radio resource, and the transmission power for the radio resource that belongs to the same slot as the selected radio resource and is already allocated;
- b5-10) if the sum of the total power allocated in the time slot is more than the maximum power even in the transmission mode having the lowest transmission rate available in the step b5-8), not attempting to allocate a radio resource for the service any more in the current frame;
- b5-11) if there is no such radio resource that has the largest GIR and is not allocated yet among the radio resources available in the current frame in step b5-2), selecting a service that has the largest GINR in the radio resource already allocated in the current frame and does not use a transmission rate having the highest transmission rate available;
- b5-12) if there is no such service, not attempting allocation for the service to which the packet selected in the current frame belongs;
- b5-13) if there is such service, temporarily establishing a transmission mode having a high transmission rate as a transmission mode for the service, re-adjusting the radio resource used for the service, and using a transmission mode having a higher transmission rate than the preceding transmission modes until non-used radio resource should exist or a transmission mode having the highest transmission rate is used;
- b5-14) if there is no non-used radio resource until the transmission mode having the highest transmission rate is used at step b5-13), not attempting allocation for the service to which the selected packet belongs any more in the current frame;
- b5-15) if there is a non-used radio resource, establishing the transmission power for the established allocation, the transmission mode for which is adjusted, including the transmission power for the transmission of the selected packet in the non-used radio resource;
- b5-16) checking if the sum of the total power allocated in the time slot, which includes the transmission power for the selected radio resource and the transmission power allocated for another radio resource which belongs to the same time slot as the selected radio resource, is not more than the maximum available power, and if the summation of the transmission power for the radio resource whose transmission mode is adjusted and the transmission power allocated for another radio resource that belongs to the same time slot is not more than the maximum available power;
- b5-17) if the sum of the total power allocated in the time slot is not more than the maximum power, confirming the allocation for packet transmission in the selected radio resource and the allocation for packet transmission in the radio resource, the transmission mode for which is adjusted; and
- b5-18) if the sum of the total power allocated in the time slot is more than the maximum power, performing the step b5-13).

18. A computer-readable recording medium for recording a program executing an adaptive packet transmission method in a cellular mobile communication system using a multi-beam satellite for, the adaptive packet transmission method comprising the steps of:
- a) being periodically reported, from mobile stations, of average receiving power levels of beam pilot signals transmitted in a plurality of beams;
- b) estimating a path gain between beams and the mobile station based on the reported average power levels of beam pilot signals;
- c) determining priorities for packets to be transmitted to each of the mobile stations as a function of a service class, a received pilot SINR of a primary beam, an average SINR value of the primary beam, a current time and a maximum tolerable waiting of a packet;
- d) selecting a beam requiring the lowest transmission power for transmitting the packet having the highest priority, and allocating the lowest power required for satisfying a predetermined packet reception quality when the packet is transmitted in the selected radio resource, by using the path gain estimated for each of the mobile stations; and e) if the radio resources and/or the transmission power that can be used are not sufficient or if there is a packet to be allocated, performing the step c).

* * * * *